(12) United States Patent
Green et al.

(10) Patent No.: US 9,924,519 B2
(45) Date of Patent: Mar. 20, 2018

(54) CHANNEL AVAILABILITY COORDINATION FOR WI-FI AND UNLICENSED BANDS USING RADIO ACCESS NETWORK

(71) Applicant: QUALCOMM Incorporated, San Diego, CA (US)

(72) Inventors: Michael Richard Green, Needham, MA (US); John Forrester, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 14/864,763

(22) Filed: Sep. 24, 2015

(65) Prior Publication Data
US 2017/0094651 A1 Mar. 30, 2017

(51) Int. Cl.
| | |
|---|---|
| H04W 72/04 | (2009.01) |
| H04W 72/12 | (2009.01) |
| H04B 7/212 | (2006.01) |
| H04W 4/02 | (2018.01) |
| H04L 12/26 | (2006.01) |
| H04W 16/14 | (2009.01) |
| H04W 74/00 | (2009.01) |
| G01S 7/02 | (2006.01) |

(Continued)

(52) U.S. Cl.
CPC ........ *H04W 72/048* (2013.01); *H04B 7/2123* (2013.01); *H04L 43/062* (2013.01); *H04W 4/021* (2013.01); *H04W 16/14* (2013.01); *H04W 72/0453* (2013.01); *H04W 72/12* (2013.01); *H04W 74/002* (2013.01); *G01S 7/021* (2013.01); *H04B 17/382* (2015.01); *H04K 3/226* (2013.01)

(58) Field of Classification Search
CPC ........... H04J 2203/0069; H04B 7/2121; H04B 7/2123; H04Q 2213/394; H04W 72/04; H04W 72/12; H04W 76/00
See application file for complete search history.

(56) References Cited

U.S. PATENT DOCUMENTS

| | | | |
|---|---|---|---|
| 2005/0272435 A1 * | 12/2005 | Tsien | G01S 7/021 455/450 |
| 2006/0082489 A1 | 4/2006 | Liu et al. | |
| 2006/0214837 A1 | 9/2006 | Liu et al. | |

(Continued)

OTHER PUBLICATIONS

International Search Report and Written Opinion—PCT/US2016/049126—ISA/EPO—Nov. 3, 2016.

*Primary Examiner* — Ashley Shivers
(74) *Attorney, Agent, or Firm* — Arent Fox LLP

(57) ABSTRACT

A method, an apparatus, and a computer-readable medium for wireless communication are provided. In one aspect, an apparatus is configured to determine whether radar signals are present on one or more channels. The apparatus is configured to transmit a channel feedback report that includes channel information for each of the one or more channels based on the determination of whether radar signals are present on the one or more channels. The channel information for each of the one or more channels includes at least one of a time at which radar signal detection was attempted, a frequency range of a detected radar signal, a set of radar signal characteristics, a received radar vector, a geographical location of the wireless device when radar signal detection was attempted, or an indication of wireless activity.

28 Claims, 12 Drawing Sheets

(51) Int. Cl.
*H04K 3/00* (2006.01)
*H04B 17/382* (2015.01)

(56) References Cited

U.S. PATENT DOCUMENTS

| | | |
|---|---|---|
| 2007/0032254 A1 | 2/2007 | Chen |
| 2010/0069013 A1 | 3/2010 | Chaudhri et al. |
| 2013/0021926 A1* | 1/2013 | Geirhofer ............ H04L 5/0048 370/252 |
| 2013/0148643 A1 | 6/2013 | Abraham et al. |
| 2014/0301328 A1 | 10/2014 | Yacovitch |
| 2014/0355532 A1 | 12/2014 | Shapira |
| 2015/0017919 A1 | 1/2015 | Kenney et al. |
| 2015/0063321 A1 | 3/2015 | Sadek et al. |
| 2016/0302076 A1* | 10/2016 | Chou .................... H04W 16/14 |
| 2017/0041949 A1* | 2/2017 | Ngo ...................... H04W 16/14 |

* cited by examiner

CHANNEL AVAILABILITY COORDINATION FOR WI-FI AND UNLICENSED BANDS USING RADIO ACCESS NETWORK

BACKGROUND

Field

The present disclosure relates generally to communication systems, and more particularly, to channel availability coordination for Wi-Fi and unlicensed bands (e.g., unlicensed long term evolution (LTE-U) channels) using a radio access network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), wireless wide area network (WWAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable medium, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station or a user equipment (UE)) for wireless communication. The apparatus is configured to determine whether radar signals are present on one or more channels. The apparatus is configured to transmit a channel feedback report that includes channel information for each of the one or more channels based on the determination of whether radar signals are present on the one or more channels.

Another aspect of this disclosure provides an apparatus for wireless communication. The apparatus includes means for determining whether radar signals are present on one or more channels. The apparatus includes means for transmitting a channel feedback report that includes channel information for each of the one or more channels based on the determination of whether radar signals are present on the one or more channels. In an aspect, the determination of whether radar signals are present is not based on whether the apparatus intends to communicate on a 5 gigahertz (GHz) channel. In another aspect, the means for determining whether radar signals are present is configured to scan the one or more channels for radar signals and store a list including the channel information associated with each of the one or more channels. In another aspect, the list indicates whether each of the one or more channels has radar signals, and the transmitted channel feedback report includes the list. In another aspect, the apparatus includes means for determining an amount of non-radar wireless activity on the one or more channels. The stored list further includes a channel desirability value associated with the determined amount of non-radar wireless activity on each of the one or more channels. In another aspect, the channel information for each of the one or more channels includes at least one of a time at which radar signal detection was attempted, a frequency range of a detected radar signal, a set of radar signal characteristics, a received radar vector, a geographical location of the apparatus when radar signal detection was attempted, or an indication of wireless activity. In another aspect, the channel feedback report indicates at least one of a time at which the channel feedback report was generated, a list of 5 GHz channels utilized by the apparatus, or a modulation type for each of the 5 GHz channels utilized by the apparatus. In another aspect, the apparatus includes means for receiving channel status information from a base station. The channel status information indicates for each channel in a set of channels at least one of whether channel information is available, whether radar was detected, or a channel desirability value. The determination of whether radar signals are present on the one or more channels is based on the received channel status information. In another aspect, the apparatus includes means for receiving additional channel feedback information detected by a second wireless device, the additional channel feedback information including feedback information on whether radar signals were detected in a set of channels or whether wireless activity was detected on the set of channels. The transmitted channel feedback report includes the received additional channel feedback information.

Another aspect of the disclosures provides for a computer-readable medium of a wireless device storing computer executable code for wireless communication. The computer-readable medium includes code for determining whether radar signals are present on one or more channels. The computer-readable medium further includes code for transmitting a channel feedback report that includes channel information for each of the one or more channels based on the determination of whether radar signals are present on the one or more channels. In an aspect, the code for determining whether radar signals are present is not based on whether the wireless device intends to communicate on a 5 GHz channel. In another aspect, the code for determining whether radar signals are present includes code for scanning the one or more channels for radar signals and storing a list including the channel information associated with each of the one or more channels. The list indicates whether each of the one or more channels has radar signals, and the transmitted channel feedback report includes the list. In another aspect, the computer-readable medium further includes code for determining an amount of non-radar wireless activity on the one or more channels. The stored list further includes a channel desirability value associated with the determined amount of non-radar wireless activity on each of the one or more channels. In another aspect, the channel information for each of the one or more channels includes at least one of a time at which radar signal detection was attempted, a frequency range of a detected radar signal, a set of radar signal characteristics, a received radar vector, a geographical location of the wireless device when radar signal detection was attempted, or an indication of wireless activity. In another aspect, the channel feedback report indicates at least one of a time at which the channel feedback report was generated, a list of 5 GHz channels utilized by the wireless device, or a modulation type for each of the 5 GHz channels utilized by the wireless device. In another aspect, the computer-readable medium further includes code for receiving channel status information from a base station. The channel status information indicates for each channel in a set of channels at least one of whether channel information is available, whether radar was detected, or a channel desirability value. The code for determining whether radar signals are present on the one or more channels is based on the received channel status information. In another aspect, the computer-readable medium further includes code for receiving additional channel feedback information detected by a second wireless device, the additional channel feedback information including feedback information on whether radar signals were detected in a set of channels or whether wireless activity was detected on the set of channels. The transmitted channel feedback report includes the received additional channel feedback information.

Another aspect of this disclosure provides an apparatus (e.g., a station or a UE) for wireless communication. The apparatus is configured to receive channel status information. The channel status information includes channel information for each 5 GHz channel within a set of 5 GHz channels. The apparatus is configured to select a 5 GHz channel from the set of 5 GHz channels based on the received channel status information.

Another aspect of this disclosure provides a method of wireless communication by a wireless device. The method includes receiving channel status information. The channel status information may include channel information for each 5 GHz channel within a set of 5 GHz channels. The method includes selecting a 5 GHz channel from the set of 5 GHz channels based on the received channel status information. In another aspect, the channel status information may include, for each 5 GHz channel, at least one of an indication of whether data is available, an indication of whether radar signals have been reported, or an indication of whether a channel desirability value is known. In another configuration, the method may include determining whether radar signals are present on the selected 5 GHz channel. In another configuration, the method may include selecting a different 5 GHz channel from the set of 5 GHz channels based on the received channel status information if the selected 5 GHz channel is determined to have radar signals. In another configuration, the method may include communicating on the selected 5 GHz channel when radar signals are absent from the selected 5 GHz channel. In yet another configuration, the method may include transmitting a message to a base station indicating the selected 5 GHz channel on which the wireless device is communicating.

Another aspect of this disclosure provides an apparatus for wireless communication. The apparatus includes means for receiving channel status information. The channel status information includes channel information for each 5 GHz channel within a set of 5 GHz channels. The apparatus includes means for selecting a 5 GHz channel from the set of 5 GHz channels based on the received channel status information. In an aspect, the channel status information includes, for each 5 GHz channel, at least one of an indication of whether data is available, an indication of whether radar signals have been reported, or an indication of whether a channel desirability value is known. In another aspect, the apparatus includes means for determining whether radar signals are present on the selected 5 GHz channel. In another aspect, the apparatus includes means for selecting a different 5 GHz channel from the set of 5 GHz channels based on the received channel status information if the selected 5 GHz channel is determined to have radar signals. In another aspect, the apparatus includes means for communicating on the selected 5 GHz channel when radar signals are absent from the selected 5 GHz channel. In another aspect, the apparatus includes means for transmitting a message to a base station indicating the selected 5 GHz channel on which the apparatus is communicating.

Another aspect of the disclosures provides for a computer-readable medium of a wireless device storing computer executable code for wireless communication. The computer-readable medium includes code for receiving channel status information. The channel status information includes channel information for each 5 GHz channel within a set of 5 GHz channels. The computer-readable medium further includes code for selecting a 5 GHz channel from the set of 5 GHz channels based on the received channel status information. In an aspect, the channel status information includes, for each 5 GHz channel, at least one of an indication of whether data is available, an indication of whether radar signals have been reported, or an indication of whether a channel desirability value is known. In another aspect, the computer-readable medium further includes code for determining whether radar signals are present on the selected 5 GHz channel. In another aspect, the computer-readable medium further includes code for selecting a different 5 GHz channel from the set of 5 GHz channels based on the received channel status information if the selected 5 GHz channel is determined to have radar signals. In another aspect, the computer-readable medium further includes code for communicating on the selected 5 GHz channel when radar signals are absent from the selected 5 GHz channel. In another aspect, the computer-readable medium further includes code for transmitting a message to a base station indicating the selected 5 GHz channel on which the apparatus is communicating.

Another aspect of this disclosure provides an apparatus (e.g., a network service, a core network, or a network entity) for wireless communication. The apparatus is configured to receive a channel feedback report from at least one wireless device. The channel feedback report indicating whether radar signals were detected on one or more channels. The apparatus is configured to transmit channel status information based on the received channel feedback report to a wireless device.

Another aspect of this disclosure provides an apparatus for wireless communication. The apparatus includes means for receiving a channel feedback report from at least one wireless device. The channel feedback report indicating whether radar signals were detected on one or more channels. The apparatus includes means for transmitting channel status information based on the received channel feedback report to a wireless device. In an aspect, the apparatus includes means for determining channel status information based on the received channel feedback report from the at least one wireless device. In an aspect, the channel status information includes channel information for each of the one or more channels. The channel information includes an indication of whether non-radar wireless activity was detected, an indication of whether a radar signal was detected, a channel desirability value, or an indication of an unknown channel desirability value. In another aspect, the apparatus includes means for receiving updated channel feedback information from the at least one wireless device. The updated channel feedback information indicating whether radar signals were detected on the one or more channels. In this aspect, the apparatus includes means for updating the channel status information based on the updated channel feedback information. In another aspect, the channel status information includes an allocated set of 5 GHz channel assignments or a recommended set of available 5 GHz channels. In another aspect, the allocated set of 5 GHz channel assignments or the recommended set of available 5 GHz channels is based on a geographical location of the wireless device or a communication type to be used by the wireless device.

Another aspect of the disclosures provides for a computer-readable medium of a wireless device storing computer executable code for wireless communication. The computer-readable medium includes code for receiving a channel feedback report from at least one wireless device. The channel feedback report indicating whether radar signals were detected on one or more channels. The computer-readable medium further includes code for transmitting channel status information based on the received channel feedback report to a wireless device. In another aspect, the computer-readable medium further includes code for determining channel status information based on the received channel feedback report from the at least one wireless device. In an aspect, the channel status information includes channel information for each of the one or more channels, and in which the channel information includes an indication of whether non-radar wireless activity was detected, an indication of whether a radar signal was detected, a channel desirability value, or an indication of an unknown channel desirability value. In another aspect, the computer-readable medium further includes code for receiving updated channel feedback information from the at least one wireless device. The updated channel feedback information indicating whether radar signals were detected on the one or more channels. The computer-readable medium further includes code for updating the channel status information based on the updated channel feedback information. In an aspect, the channel status information includes an allocated set of 5 GHz channel assignments or a recommended set of available 5 GHz channels. In another aspect, the allocated set of 5 GHz channel assignments or the recommended set of available 5 GHz channels is based on a geographical location of the wireless device or a communication type to be used by the wireless device.

DETAILED DESCRIPTION

Figure 1:
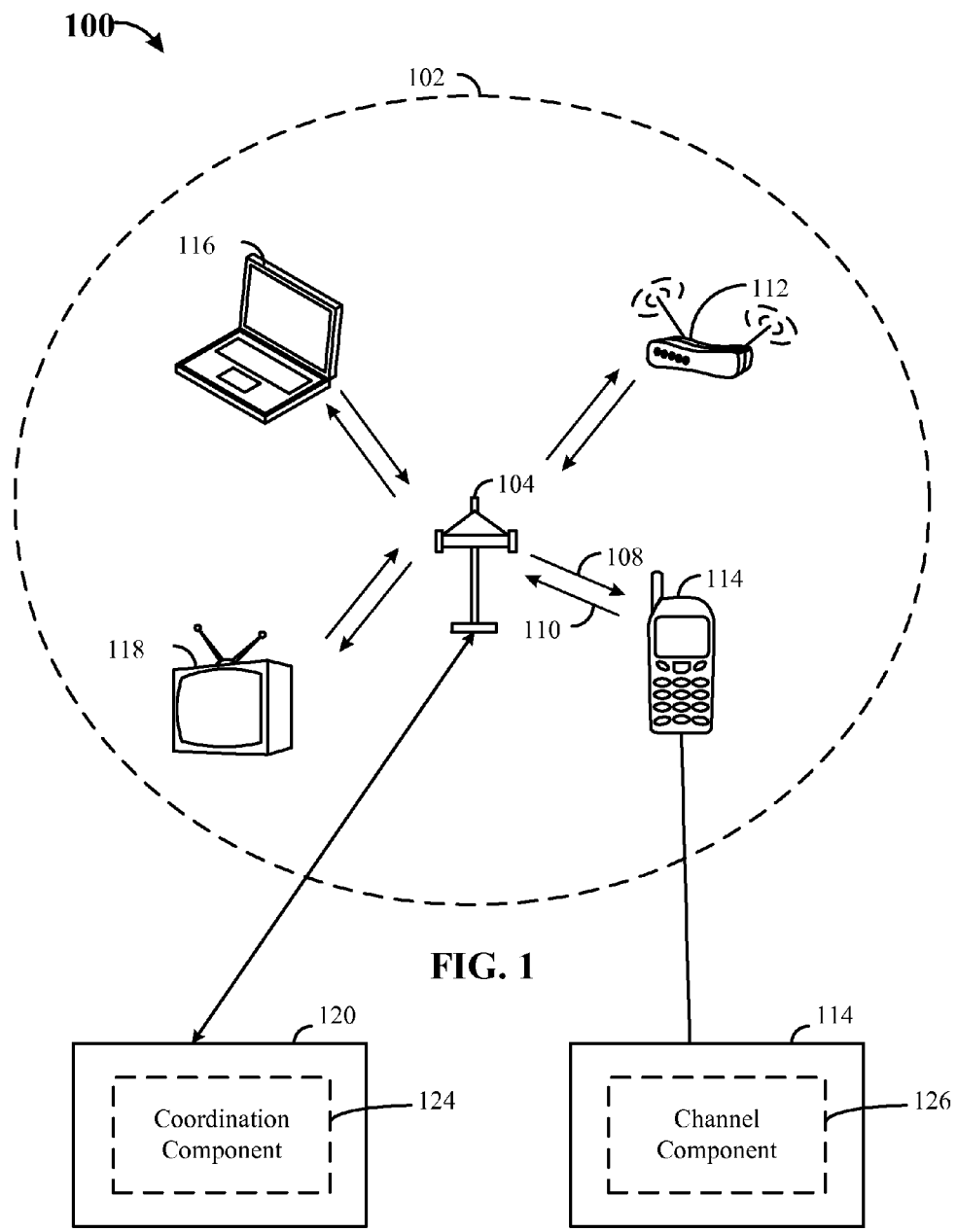
FIG. 1 shows an example wireless communication system in which aspects of the present disclosure may be employed.

Various aspects of the novel systems, apparatuses, computer-readable medium, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer-readable media, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs" Or UEs). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard and/or the LTE standard, for example. Such devices, whether used as a STA or an AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to one or more wireless standards, for example the 802.11 standard and/or the LTE standard. The wireless communication system 100 may include an AP 104, which communicates with STAs (e.g., STAs 112, 114, 116, and 118). In the present disclosure, the term STA may be used interchangeably with the term UE. In aspect, the AP 104 may be an access point in a WLAN or a base station (e.g., an evolved Node B) in an LTE network, for example. The wireless communication system 100 may include a core network 120. In an aspect, the core network 120 may be an Evolved Packet Core of an LTE network or a network entity.

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102.

A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the STA 114 may include one or more components for performing various functions. For example, the STA 114 may include a channel component 126 to perform procedures related to providing channel feedback reports on 5 GHz channels and receiving channel status information on the 5 GHz channels. In one configuration, the channel component 126 may be configured to determine whether radar signals are present on one or more channels and transmit a channel feedback report that includes channel information for each of the one or more channels based on the determination of whether radar signals are present on the one or more channels.

In another configuration, the channel component 126 may be configured to receive channel status information. The channel status information may include channel information for each 5 GHz channel within a set of 5 GHz channels. The channel component 126 may be configured to select a 5 GHz channel from the set of 5 GHz channels based on the received channel status information.

In another aspect, the core network 120 may include one or more components for performing various functions. For example, the core network 120 may include a coordination component 124 to coordinate the availability of 5 GHz band channels. In one configuration, the coordination component 124 may be configured to receive a channel feedback report from at least one wireless device. The channel feedback report may indicate whether radar signals were detected on one or more channels. The coordination component 124 may be configured to transmit channel status information based on the received channel feedback report to a wireless device. In another aspect, the functions of the core network 120 may be performed by the AP 104. Although this embodiment describes the availability coordination with respect to 5 GHz channels, availability coordination may be provided for other unlicensed channels or for 2.4 GHz channels.

Ever-increasing wireless traffic has escalated the need for additional spectral resources. Although wireless communication mainly occurs in the spectrum from 700 MHz to 2.6 GHz, soaring wireless traffic has led wireless operators and equipment manufacturers to develop products that use the unlicensed spectrum (e.g., spectrum residing in the 5 GHz band such as in unlicensed LTE (e.g., LTE-U) and in WLAN). As an example, the unlicensed spectrum may reside in the 5 GHz band. Previously, the 5 GHz band was primarily used for radar signaling such as in radio-navigation, satellite transmissions, radio-location, weather, etc. Increasingly, however, the 5 GHz band is being used by individual users for LTE and/or Wi-Fi access. By enabling mixed use of the 5 GHz channels, interference to radar transmission and reception may increase. To avoid interference with radar systems, wireless devices operating in the 5 GHz bands may need to comply with radar detection and dynamic frequency selection (DFS) conformance rules. Before transmitting on the 5 GHz bands, a DFS device (e.g., a WLAN AP, a UE, or a STA that implements Wi-Fi-Direct and/or soft AP modes) may independently detect radar by performing channel availability checks (CACs) to listen for the presence of radar signals. If radar is detected on a channel, then the DFS device may not use the channel and may flag the channel as unavailable. If radar is not detected on the channel (e.g., if a channel is free from radar for at least 60 seconds), then the DFS device may use the 5 GHz channel for communication.

Requiring each UE to independently perform and repeat such channel availability checks on every 5 GHz band channel may be a waste of resources, especially when another UE within proximity has already determined that one or more 5 GHz channels contains radar signals. A need exists for a coordinated approach for determining the availability of channels within the unlicensed band. In an aspect, hardware that implements the LTE-U technology (or other unlicensed band technology) with WLAN and LTE cellular radios (e.g., smartphones and base station infrastructure) may enable UEs to share temporal, frequency, and geographic information related to the presence of fixed and mobile radars that need to be avoided. Information on unlicensed band channels may be transmitted to a central location, such as a core network or radio access network, and compiled so as to enable the provision of channel status information and channel recommendations in the unlicensed band to other devices. As an additional application, related to avoiding radars, channel choice coordination for UEs in the same geographical area may improve access to the available unlicensed spectrum, especially in high congestion areas such as mobile hotspots in a convention center or media event or in an apartment building or dense neighborhood.

Figure 2:
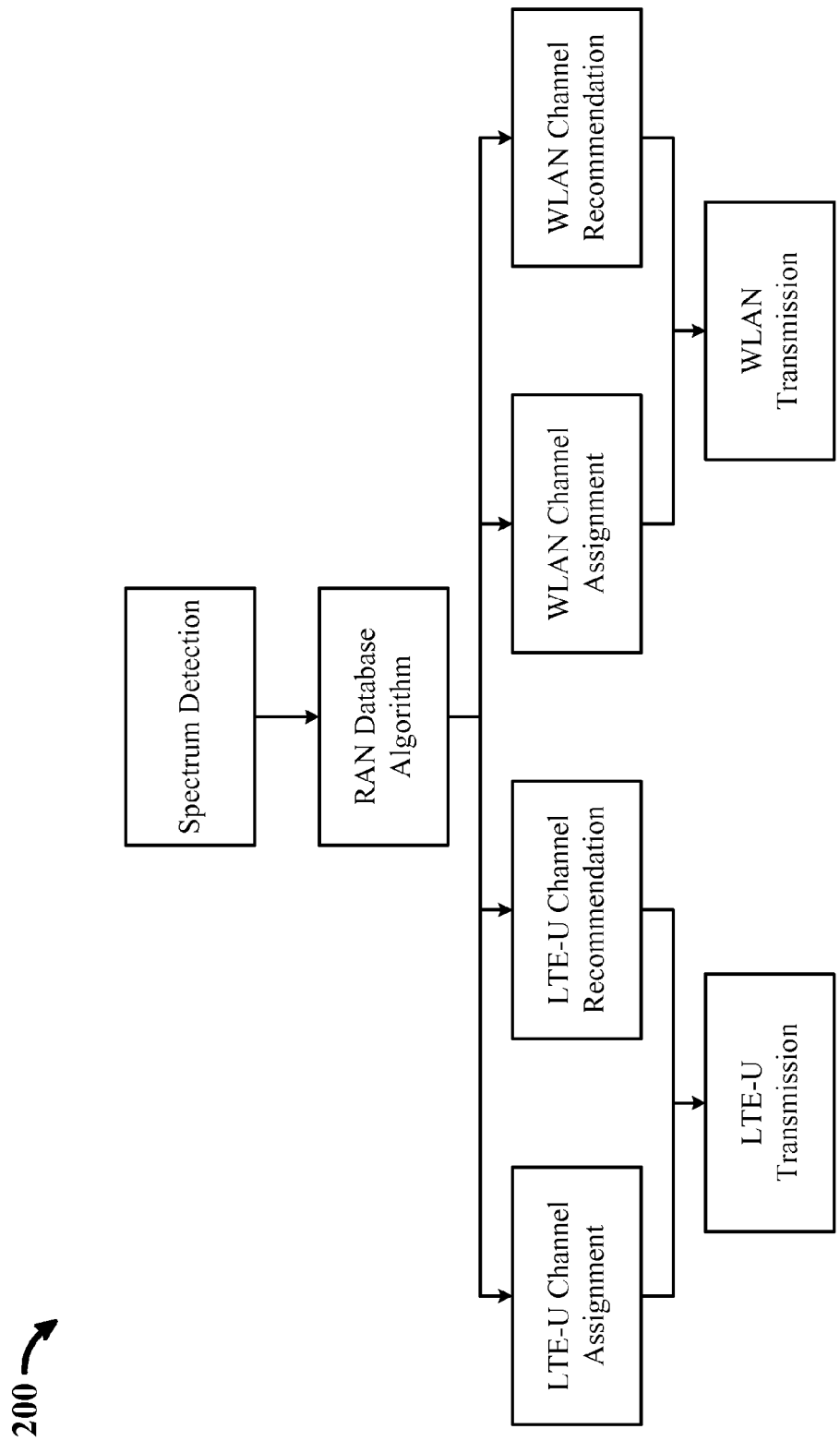
FIG. 2 is an exemplary high level flow diagram of a method of unlicensed band channel availability coordination for unlicensed LTE and Wi-Fi.

FIG. 2 is an exemplary high level flow diagram 200 of a method of unlicensed band channel availability coordination for unlicensed LTE and Wi-Fi. New communication channels between a cellular radio network and a cellular user equipment, which includes WLAN and LTE-U support, may be used to support 2.4 GHz channel availability coordination and 5 GHz unlicensed band channel availability coordination. Additionally, in-device and network based algorithms may be used to advantageously coordinate operation of devices using unlicensed bands. Initially, various wireless devices (e.g., a UE) may perform spectrum detection to determine whether one or more channels in the 5 GHz band, for example, contains radar signals, wireless activity (e.g., Wi-Fi signals), or other channel noise. In an aspect, the wireless devices may perform a channel availability check (CAC) every 60 seconds (or up to 10 minutes) in certain channels at startup and build a list of scanned channels found to be free of radar and found to contain radar based on the radar detect algorithms and the rules required for a current geography of operation. Furthermore, during normal operation, the wireless device may continue to scan for radar on a current channel of operation (and may be allowed to scan on alternate channels in some regulatory domains). This mandatory in-service-monitoring (ISM) may also result in the identification of radars signals on the current channel that was previously thought to be free of radar.

Based on in-device algorithms, enabled UEs may collect radar detection data (e.g., timestamp of radar detection, frequency boundaries of detected radar, geographic location of the UE, and characteristics of the detected radar pulses/patterns). The radar detection data is collected by all UEs operating in a small or large cell and communicated back to the radio network (or core network) using whichever radio is available at the time of detection (e.g., WLAN, LTE-U, or LTE). Additionally, the presence and characteristics of other 5 GHz operation (e.g., BSSs) may be collected and transmitted.

The radio network may receive and store the radar detection data in a database and process the radar detection data (e.g., radar data and presence of other WLAN BSSs in the area) using one or more algorithms. The algorithms may enable the radio network to determine, on a cell-by-cell basis, which channels are currently free from radar, have radar, and/or have other wireless signals. The algorithms may enable the radio access network to generate advisory data to indicate as to which channels a device need not perform CAC because radar was already detected and which channels that are free from radar are optimum for LTE-U/Wi-Fi use. In turn, the radio network sends the advisory data to UEs in the same cell or within bounded geographic area with respect to the reporting device (e.g., within a radius) indicating which 5 GHz unlicensed channels were found to contain radars. This channel status information enables other UEs to avoid doomed CACs and to follow guidance from the radio network to choose new 5 GHz channels of operation that are known to be geographically and temporally separated from radars detected by other UEs and known to be free of other WLAN devices. In an aspect, the radio network may provide LTE-U channel recommendations and/or assignments to various UEs via LTE-U transmission. In another aspect, the radio network may provide WLAN channel assignments and/or recommendations to various UEs via WLAN transmission.

Furthermore, the radio network may be able to track and coordinate current 5 GHz channel of operation of all UEs and perform active network planning by sending messages to UEs with recommended channels to commence 5 GHz operation. This method may take advantage of additional algorithms to achieve the goals of 5 GHz unlicensed band coordination, even in a likely mixed environment containing 5 GHz WLAN devices, some of which may or may not implement the necessary message support to the radio network. The mixed environment may be supported by UEs reporting the presence of other 5 GHz BSSs (including received signal strength indicators (RSSIs) and service set identifications (SSIDs)) to deduce approximate location of non-reporting devices.

Alternate implementations of channel availability coordination may be accomplished using device to device operation. A first UE may collect radar and non-radar signal data and include such data in WLAN beacons. A second UE in the area may decode the data in the WLAN beacon without connecting to the cellular radio network and pass on the first UE's data and similar data collected by the second UE in a WLAN beacon transmitted by the second UE. In this aspect, a type of mesh sharing of spectrum availability information may be implemented for devices operating within a bounded area.

Although the aforementioned discussion utilizes the 5 GHz band as the unlicensed spectrum, other unlicensed frequency bands capable of supporting cellular and/or WLAN connections may also be used. Furthermore, although the discussion refers to LTE-U as an example, it is understood that the principles and techniques described herein may also be applicable to coordinate channel availability for WLAN and other wireless technology deployed over other unlicensed spectrums.

Figure 3:
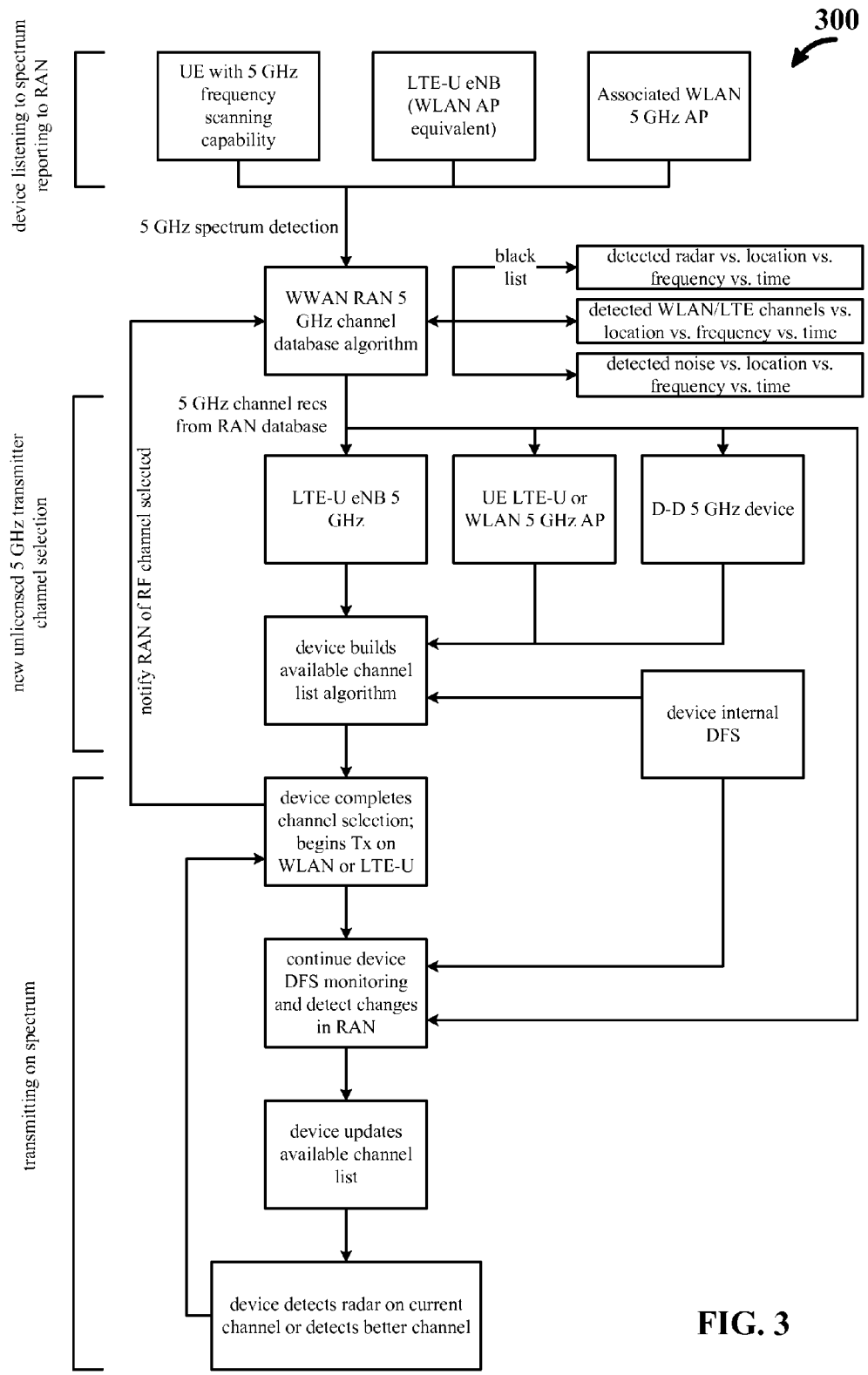
FIG. 3 is an exemplary detailed flow diagram of a method of unlicensed band channel availability coordination for unlicensed LTE and Wi-Fi.

FIG. 3 is an exemplary detailed flow diagram 300 of a method of unlicensed band channel availability coordination for unlicensed LTE and Wi-Fi. Initially, devices within a single cell may listen to an unlicensed spectrum (e.g., the 5 GHz spectrum) and report data to a radio access network. For example, UEs with 5 GHz frequency scanning capability may scan for radars and/or determine whether wireless activity and/or channel noise is present on one or more channels. LTE-U eNBs (or other unlicensed LTE eNBs), which may be low powered eNBs, may also perform frequency scanning in the 5 GHz range. In addition, associated WLAN 5 GHz APs within the cell may perform frequency scanning to determine whether any of the 5 GHz channels have radar signals and/or wireless activity/channel noise. The scanned/detected information from each of the devices may be provided to a WWAN radio network. The WWAN radio network may store the received scanning data and subject the data to one or more algorithms for purposes of determining channel status information and providing channel recommendations. In one aspect, the data may indicate that radar is detected at a particular geographical location (e.g., a cell ID) at a certain frequency/channel at a particular time. In this aspect, the algorithm may temporarily black list the channel by not making the channel available for communication in LTE-U and Wi-Fi until updated data indicating that no radar signals are detected and a predetermined time period has elapsed. In another aspect, the data may indicate that WLAN or LTE-U is detected on one or more channels/frequencies at a particular geographical location at a specific time. In this aspect, the algorithm may assign a channel desirability value (CDV) to the channel, and the channel desirability value may be associated with a timestamp. The timestamp may be a time at which the CDV is assigned or a time at which the WLAN or LTE-U was detected on the channel. In yet another aspect, the data may indicate that noise is detected on a particular channel/frequency at a particular geographical location and at a particular time. In this aspect, the algorithm may assign a channel desirability value to the channel based on the detected noise. In an aspect, the CDV may be based on the detected noise and the detected WLAN/LTE-U activity. Based on the received data from the various devices, the radio network may determine for one or more channels in the 5 GHz spectrum, whether the one or more channels has radar, WLAN/LTE-U activity, or noise. Based on this determination, the radio network may provide 5 GHz channel status information and channel recommendations to LTE-U eNBs, to UEs supporting LTE-U or 5 GHz WLAN, to WLAN 5 GHz APs, or to UEs for D-D communication over the 5 GHz band. Devices receiving channel status information and channel recommendations from the radio network may build an available channel list. The devices may avoid channels that are known to have radar signals or high levels of wireless activity or noise. The device may perform DFS on candidate channels, and upon determining no radar exists on one channel, the device may select the channel for transmission on WLAN or LTE-U. The device may transmit information to the radio network indicating the selected channel to be used for LTE-U or 5 GHz WLAN transmission. While operating on the selected channel, the device may continue to perform ISM on the channel to determine whether radar signals are found on the channel. The device may receive updated channel status information and updated channel recommendations from the radio network. Based on the updated channel status information and updated channel recommendations, the device may update the availability channel list. In an aspect, if a new channel with better conditions is found (e.g., less Wi-Fi activity or channel noise), the device may move to the new channel. In another aspect, if radar is detected on the current channel, the device may move to a different channel for data transmission to avoid radar signals.

Although the aforementioned discussion utilizes the 5 GHz band as the unlicensed spectrum, other unlicensed frequency bands capable of supporting cellular and/or WLAN connections may also be used. Furthermore, although the discussion refers to LTE-U as an example, it is understood that the principles and techniques described herein may also be applicable to coordinate channel availability for WLAN and other wireless technology deployed over other unlicensed spectrums.

Figure 4:
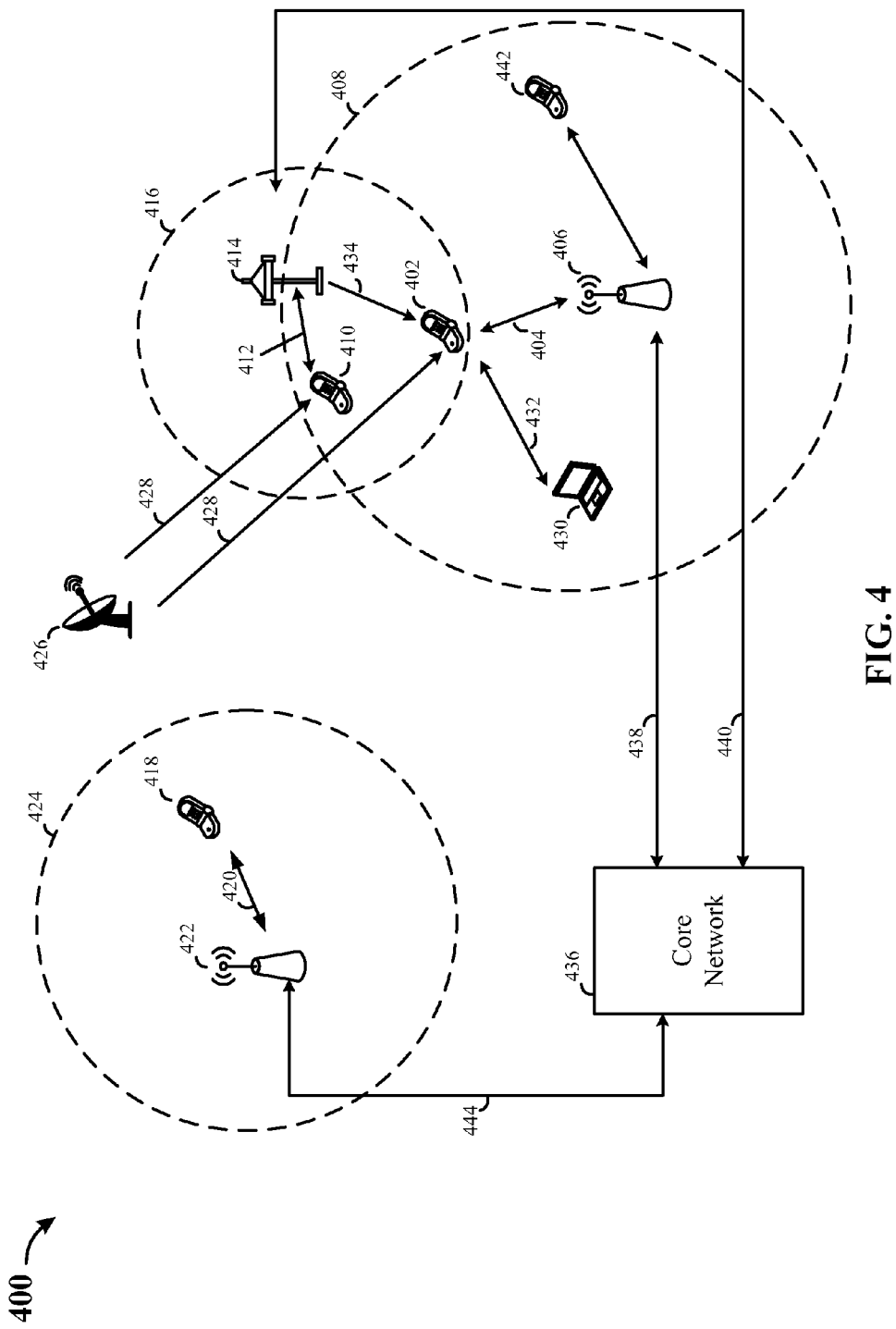
FIG. 4 is an exemplary diagram of a wireless network employing availability coordination for unlicensed LTE and Wi-Fi.

FIG. 4 is an exemplary diagram 400 of a wireless network employing availability coordination for unlicensed LTE and Wi-Fi. Referring to FIG. 4, a first UE 402 may be communicating 404 with a first base station 406 within a first cell 408. The first base station 406 may be an eNB, and the first UE 402 and the first base station 406 may be communicating 404 over an LTE link (or some other wireless protocol). A second UE 410 may be communicating 412 with a second base station 414 within a second cell 416. The second base station 414 may be a lower powered base station such as an LTE-U eNB. The second base station 414 may communicate with the second UE 410 over LTE or unlicensed LTE (e.g., LTE-U). The second UE 410 and the second base station 414 may be located within the first cell 408. A third UE 418 may be communicating 420 with a third base station 422 over LTE or some other wireless protocol within a third cell 424. The third base station 422 may be an eNB. A radar 426 may be in a geographic vicinity of the first cell 408, the second cell 416, and/or the third cell 424. The radar 426 may transmit radar signals 428 (e.g., signals in the 5 GHz bands) toward the direction of the first cell 408 and the second cell 416 but not the third cell 424. Furthermore, the first base station 406 may have a first connection 438 with a core network 436 (e.g., an evolved packet core, a network server, etc.). The second base station 414 may have a second connection 440 with the core network 436. The third base station 422 may have a third connection 444 with the core network 436. In other words, the first, second, and third base stations 406, 414, 422 may each communicate with the core network 436.

In an aspect, for channel N, where N is any IEEE channel number in the 5 GHz channel band, the core network 436 may initially have no data on channel N. The third UE 418 may support operation using 5 GHz Unlicensed National Information Infrastructure (U-NII) radar bands (e.g., 5 GHz U-NII radar bands in IEEE channel numbers 52-144). The third UE 418 may support other U-NII subbands. The third UE 418 may employ a dynamic frequency selection (DFS) function to detect radar signals and avoid co-channel operation with radar systems (e.g., the radar 426). The third UE 418 may perform a radar scan (e.g., perform a channel availability check or CAC) to identify any channels that contain and/or do not contain radar signals or other signals (e.g., Wi-Fi signals). In an aspect, the third UE 418 may perform the radar scan even when the third UE 418 does not intend to communicate on a 5 GHz channel. The third UE 418 may scan the various 5 GHz channel bands periodically (e.g., once every 60 seconds or at any other interval). In an aspect, the third UE 418 may employ wideband radar scanning (e.g., the IEEE 802.11ac specification allows scanning 80 MHz or 160 MHz of spectrum at once). In each 5 GHz channel band, the third UE 418 may determine whether any noise or signals are detected. For example, the third UE 418 may perform a CAC on channel N (e.g., N=52) and not detect any radar signals (either because the radar 426 has not begun transmitting or because the radar 426 is not transmitting in the direction of the third cell 424). Based on the CAC, the third UE 418 may determine that channel N does not have any radar signals. In one configuration, the third UE 418 may determine whether channel N has non-radar signals (e.g., Wi-Fi signals) or channel noise. In one aspect, the third UE 418 may measure an energy detection level on channel N and determine that the energy detection level is below an energy threshold required to indicate that there is wireless activity (e.g., Wi-Fi transmissions) on channel N. In another aspect, the third UE 418 may determine whether the third UE 418 has received any WLAN preambles on channel N. If no WLAN preambles are received, the third UE 418 may determine that there is no wireless activity on channel N. The third UE 418 may store (e.g., in a list or table) the results of the channel scans as channel information for channel N, and for any other channels that are scanned.

In one configuration, channel information as determined for each channel, including channel N, may include one or more of: a time at which radar signal detection was attempted, an indication of whether radar was detected (e.g., a CAC bit indicator, in which CAC=0 if no radar detect, and CAC=1 if radar is detected), a frequency range of a detected radar signal, a set of radar signal characteristics associated with any detected radar signal (e.g., radar signals coded using FCC radar pattern types or raw received radar pulse data), a received radar vector (e.g., direction and speed of travel of the third UE 418 and received signal strength of radar pulses over time), a geographical location of the third UE 418 when radar signal detection was attempted (e.g., a cell ID associated with the third base station 422 or GPS coordinates of the third UE 418), an indication of wireless activity on each of the one or more channels, or an indication of channel noise on each of the one or more channels. The indication of wireless activity may identify the presence of other 5 GHz unlicensed device operation (e.g., handsets, PCs, consumer devices, enterprise and home networks, automobiles, etc.). In one aspect, the wireless activity may be indicated by a channel desirability value (CDV). A CDV may range from 0-9. A CDV of 0 may indicate that the channel is free or nearly free from wireless activity/channel noise and/or does not have any transmissions from other BSSs. By contrast, a channel desirability value of 9 may indicate that the channel is very busy (e.g., the energy detection level is beyond a threshold, the number of received WLAN preambles is beyond a threshold, channel noise is high) and cannot support any additional devices/connections. The CDV may be associated with a channel desirability timestamp that indicates when the CDV was determined by the third UE 418 or when the channel was measured. In another aspect, the indication of wireless activity may be a channel measurement (e.g., an energy detection level and/or a number of received preambles). In another aspect, the channel information may include the cell IDs associated with the geographical location(s) at which the radar and/or non-radar signal detections were performed.

The third UE 418 may generate a first channel feedback report using the determined channel information. In addition to the channel information, the first channel feedback report may include one of: a timestamp at which the channel feedback report was generated, a list of 5 GHz channels utilized by the third UE 418, and/or a modulation type (e.g., 802.11a, 802.11ac, 802.11a VHT80, BSS, Wi-Fi Direct, or Hotspot operation) for each of the 5 GHz channels utilized by the third UE 418.

The third UE 418 may transmit the first channel feedback report to the core network 436 via the third base station 422. The first channel feedback report may indicate that no radar signals were detected on channel N (e.g., CAC bit=0 in the first channel feedback report). Upon receiving the first channel feedback report, the core network 436 may store the channel information included in the first channel feedback report and set CAC=0, based on the first channel feedback report, to indicate that channel N is clear of radar. If the first channel feedback report only included a CAC value but not a channel desirability value, the core network 436 may indicate that the channel desirability value of channel N is unknown. In addition to the CAC value, the core network 436 may also store any timing information/timestamp associated with the CAC value (e.g. when the CAC was performed).

In addition to determining that radar signals were not present on channel N, the third UE 418 may have determined that non-radar signals also were not detected on channel N. Based on the determination, the third UE 418 may choose or determine a channel desirability value for channel N based on the level of wireless activity detected on channel N (e.g., channel desirability value=0). The third UE 418 may transmit a second channel feedback report to the core network 436, and the second channel feedback report may include a channel desirability value for channel N (CDV=0). The second channel feedback report may also include a time at which the non-radar signal detection/measurement occurred. Upon receiving the second channel feedback report, the core network 436 may store channel information for channel N indicating that channel N has the channel desirability value of 0 (e.g., CDV=0), and the channel desirability value may be associated with a timestamp at which the detection was performed. Based on the first and second channel feedback reports, the core network 436 may determine that channel N is clear of radar and has a channel desirability value of 0. The status of channel N (e.g., clear of radar with channel desirability value of 0) may be associated with a timestamp. The core network 436 may utilize the timestamp to determine when to update current channel information with new channel information or to determine when the current channel information is so outdated that the current channel information is no longer reliable and should be considered discarded or not relied upon. The channel information for channel N may be associated with the geographical location of the third UE 418 such as the cell ID of the third base station 422 or the GPS coordinates of the third UE 418. As such, the core network 436 may share the channel information received from the third UE 418 with other UEs within a vicinity of the third UE 418 (e.g., within the same cell as the third UE 418 or within a certain radius of the third UE 418). In an aspect, the third UE 418 could have sent the radar detection and non-radar detection channel information associated with channel N in the same channel feedback report rather than in separate channel feedback reports.

Continuing with FIG. 4, in the first cell 408, the first UE 402 may want to initiate a Wi-Fi hotspot for a local device 430 and communicate 432 with the local device 430. The local device 430 may be a personal computer (or any other wireless device). The first UE 402 may support operation using 5 GHz U-NII radar bands (e.g., 5 GHz U-NII radar bands in IEEE channel numbers 52-144) and other U-NII subbands. The first UE 402 may employ a DFS function to detect radar signals and avoid co-channel operation with radar systems (e.g., the radar 426). The first UE 402 may perform a CAC to identify any channels that contain and/or do not contain radar signals or other signals (e.g., Wi-Fi signals). In an aspect, the first UE 402 may perform the CAC even when the first UE 402 does not intend to communicate over a 5 GHz channel. The first UE 402 may scan the various 5 GHz channel bands once every 60 seconds (or at any other interval). In an aspect, the first UE 402 may employ wideband radar scanning (e.g., the IEEE 802.11ac specification allows scanning 80 MHz or 160 MHz of spectrum at once). In each 5 GHz channel band, the first UE 402 may determine whether any signals are detected. For example, the first UE 402 may detect the radar signals 428 on channel N and non-radar signals 434 on channel N+x (where x is an integer value such that N+x corresponds to an IEEE radar channel). In an aspect, the non-radar signals 434 may be Wi-Fi signals. The first UE 402 may compare the radar signals 428 and the non-radar signals 434 with known characteristics of radar signals (e.g., a number of pulses received within a period of time, bandwidth characteristics of the detected signals, frequency characteristics of the detected signals, received signal strength of the detected signals, etc). If the comparison indicates a match or a potential match with radar signals (e.g., a correlation above a defined threshold), the first UE 402 may determine that the radar signals 428 are indeed radar signals. If the comparison indicates that there is no match (e.g., correlation below a defined threshold), the first UE 402 may determine that the non-radar signals 434 are not radar signals. In an aspect, the non-radar signals 434 may be Wi-Fi signals transmitted in the 5 GHz channel bands. In this aspect, the first UE 402 may determine that other devices may be communicating on one or more 5 GHz channels over a Wi-Fi connection. In yet another aspect, if no signals are detected on the remaining 5 GHz band channels, the first UE 402 may determine that no data is being transmitted on the remaining 5 GHz channels. After the channel availability check is complete, the first UE 402 may have a channel list indicating one or more 5 GHz channels found to: (1) be free of radar and any other 5 GHz signals; (2) have radar but not any other 5 GHz signals; or (3) be free of radar but have other 5 GHz signals (e.g., a CDV). The first UE 402 may select a 5 GHz channel band to commence hotspot operation with the local device 430. Based on DFS, the first UE 402 may avoid the channels on which the radar signals 428 were detected (e.g., channel N). The first UE 402 may avoid (but is not required to avoid) 5 GHz channels on which only the non-radar signals 434 have been detected (e.g., channel N+x) if other channels on which no signals have been detected are available. The first UE 402 may select a channel on which no signals are detected, or on which wireless activity is low, for establishing a hotspot with the local device 430. While connected with the first base station 406 and providing a Wi-Fi hotspot to the local device 430 using a 5 GHz channel band, the first UE 402 may perform in-service monitoring (ISM). That is, during normal operation, the first UE 402 may continue to scan for radar on a current channel of operation (and may also scan other channels). ISM enables the first UE 402 to identify any radar signals that may be detected after a CAC has been performed.

The first UE 402 may store (e.g., in a list or table) the channel information for each of the scanned channels determined based on one or more CACs and/or one or more ISMs. The first UE 402 may transmit the channel information for each of the 5 GHz channel bands in a third channel feedback report to the core network 436 via the first base station 406. For example, the first UE 402 may transmit channel information for channel N, indicating that radar signals were detected on channel N but otherwise channel N has a channel desirability value of 0. The first UE 402 may transmit channel information for channel N+x in which the channel information includes a CDV and a timestamp, among other information.

Upon receiving one or more channel feedback reports from one or more UEs (e.g., the first UE 402 and the third UE 418), the core network 436 may analyze the received channel information associated with each of the received channel feedback reports and generate channel status information in a real-time table. The core network 436 may maintain a separate real-time table of all reported 5 GHz channel data from UEs within a single cell area. The core network 436 may maintain data for each 20 MHz WLAN channel with timestamps. The channel status information may be stored in a table with fields such as those shown in Table 1 shown below.

TABLE 1

Channel Availability Table for a Single Cell

| Channel No. | CAC | CAC Timestamp | ISM | ISM Timestamp | CDV | CDV Timestamp |
|---|---|---|---|---|---|---|
| N | 1 | 4/3/15 10:30:20 | Unknown | Unknown | 0 | 4/3/15 10:30:30 |
| N + x | 0 | 4/3/15 10:31:09 | Unknown | Unknown | 2 | 4/3/15 10:31:58 |

Table 1 illustrates an exemplary real-time table for a single cell. Although two channels are listed in Table 1, any number of channels in the 5 GHz band may be included in the table. The table may include all 5 GHz WLAN channels in a regulatory domain, including channels that do not require radar detection. The channel information for each channel may be based on information received from one or more channel feedback reports. If no channel information for a channel was received, the table may indicate no data is available. For each channel, the table may indicate a CAC value, which may be a bit value. CAC may be set to 0 if no radar signals are detected and set to 1 if radar signals are detected. The CAC value may be associated with a CAC timestamp, indicating a date and time at which the CAC was performed or received. The table may indicate an ISM value, which may be a bit value. ISM may be set to 0 if no radar signals are detected during in-service-monitoring and set to 1 if radar signals are detected during ISM. The ISM value may be associated with an ISM timestamp indicating a date and time at which the ISM was performed or received. The ISM value is set to an unknown value (e.g., a null value) because channel N, for example, already has radar signals, and therefore, no UEs are using the channel so as to require ISM. The table may include a CDV ranging between 0-9. The CDV may indicate the level of wireless activity in a channel. The CDV may be associated with a CDV timestamp, indicating a date and time at which the CDV was determined or received.

Referring to FIG. 4, upon receiving the third channel feedback report from the first UE 402, the core network 436 may determine that the CAC is set to 1 for channel N in the third channel feedback report, indicating that radar is present on channel N. In one configuration, if the first UE 402 and the third UE 418 are within the same cell, the core network 436 may update the channel information for channel N. In this configuration, channel N was previously determined to be clear of radar by the third UE 418. However, based on the third channel feedback report received from the first UE 402 that contains a more recent timestamp associated with a more recently performed CAC, the core network 436 may determine that channel N now contains radar signals.

In another configuration (pictured), if the first UE 402 and the third UE 418 are not within the same cell, the core network 436 may assume that the first UE 402 and the third UE 418 are not within close proximity of each other. In other words, the radar signals 428 detected by the first UE 402 may not be in range of the third UE 418. In this configuration, the core network 436 may determine that channel N continues to be clear of radar with respect to the third UE 418 and other wireless devices with the same cell ID as the third cell 424. But for channel N in the first cell 408, the core network 436 may determine that channel N has radar signals. As such, all devices with the same cell ID as the first cell 408 may be within range of the radar signals 428.

This assumption by the core network 436 is based on the understanding that radars may transmit with high power. UEs in the same cell area (approximate radius of a typical cell tower) may be within the detection threshold. When the core network 436 receives the third channel feedback report from the first UE 402, the core network 436 may assume that any radar signals 428 reported by the first UE 402, located in the first cell 408 associated with the first base station 406, is within range of all other UEs (e.g., the fourth UE 442 and the second UE 410) and wireless devices (e.g., the second base station 414) within the first cell 408.

After receiving the third channel feedback report, for channel N, the core network 436 may store the channel information included in the third channel feedback report. The core network 436 may set CAC to 1 based on the determination that radar signals have been detected. The core network 436 may set a radar reset value associated with channel N to 0. The radar reset value is a value used for remediating false positives or false negatives in radar detection.

The core network 436 may compile the channel information provided with respect to the first cell 408 into a real-time table such as the one shown in Table 1. Data from the real-time table may be transmitted to various devices as channel status information. The channel status information may include channel information for each of the 5 GHz channels such as an indication of whether any data is available for a channel (e.g., channel N), whether radar was detected on the channel, whether non-radar wireless activity or channel noise was detected on the channel, or an indication of the channel desirability value for the channel. In an aspect, the real-time table may be updated periodically (or aperiodically) based on updated channel feedback reports from other devices within the cell.

In an aspect, the channel status information provided to devices within a cell may include channel assignments and/or recommendations. Channel assignments may refer to a set of channels that a device is required to select from, and channel recommendations may refer to a set of channels that the device is recommended to select from. For example, in the first cell 408, LTE-U may be used by the first UE 402, the second UE 410 via the second base station 414, and the fourth UE 442. If the core network 436 provided only channel information to the various devices, the various devices may all select the most available channel (e.g., the channel with a CDV of 0) without radar signals for LTE-U communication. However, uncoordinated channel selection may lead to certain channels becoming overwhelmed with wireless activity. Instead, for each of the various devices, the core network 436 may include channel assignments or recommendations. In an aspect, the channel assignments or recommendations may be based on a distance between the device and the base station. In another aspect, the channel assignments or recommendations may be based on priority associated with either the device or with the data to be transmitted. Furthermore, the list of available channels may also be filtered by taking into account the country of operation, which may include known regulatory limits and allowed transmission powers. Each device may receive a set of channel assignments or recommendations that is different from the channel assignments or recommendations intended for another device.

For example, the core network 436 may transmit channel status information to the fourth UE 442, and the channel status information may indicate, for every 5 GHz channel, whether the core network 436 has data on the channel, whether radar was reported, a channel desirability value, and a set of channel recommendations in which the set of channels within the channel recommendations is a subset of all the 5 GHz channels. Subsequently, the fourth UE 442 may select a channel among the subset of channels recommended by the core network 436.

Meanwhile, the second UE 410 may be communicating 412 in the second cell 416 with the second base station 414. The second base station 414 may be a lower powered base station compared to the first base station 406. For example, the second base station 414 may be a LTE-U eNB or 5 GHz WLAN AP. The second UE 410 may request the use of a 5 GHz unlicensed spectrum (e.g., initiate a 5 GHz Wi-Fi hotspot or an LTE-U downlink). The core network 436 may periodically transmit channel status information to the second UE 410 (e.g., via the first base station 406) because the second UE 410 is within the first cell 408 of the first base station 406. The channel status information may indicate, for each 5 GHz channel, whether the core network 436 has data for the channel, whether radar was detected on the channel, the channel desirability value is for the channel, and/or a set of channels recommended for use by the second UE 410. The set of channels recommended to the second UE 410 may be different from the set of channels recommended to the first UE 402. The core network 436 may also transmit channel status information to the fourth UE 442.

By receiving channel status information from the core network 436, the fourth UE 442 and the second UE 410 may avoid performing CAC on certain channels because the fourth UE 442 and the second UE 410 may already know whether one or more channels has radar signals. Moreover, the fourth UE 442 and the second UE 410 may be able to quickly identify, based on the channel status information, which channels are clear of radar and have good channel quality (e.g., not busy). Furthermore, by utilizing the channel assignments or recommendations, the fourth UE 442 and the second UE 410 may select channels for use in a coordinated manner such that wireless traffic may be distributed over multiple 5 GHz channels.

In an aspect, referring to FIG. 4, after receiving the channel status information from the core network 436, the second UE 410 may initiate an LTE-U downlink using a 5 GHz spectrum recommend by the core network 436. Based on the received channel status information, the second UE 410 may avoid choosing candidate channels for performing CAC that are already known to contain radar signals. The channel status information may suggest which 5 GHz channels the second UE 410 should commence operation for LTE-U operation. In an aspect, the second UE 410 may use one of the recommended channels from the core network 436 or the second UE 410 may select a different channel from the available channels indicated in the channel status information to commence or move operation in 5 GHz unlicensed band.

In an aspect, the radar 426 may stop transmitting the radar signals 428 on channel N, for example. The first UE 402 may perform a CAC and not detect any radar signals on channel N. The first UE 402 may transmit a fourth channel feedback report to the core network 436. Upon receiving the fourth channel feedback report indicating that channel N no longer has radar signals, the core network 436 may increment the radar reset value from a previous value of 0 to a value of 1. Subsequently, if the core network 436 receives another channel feedback report indicating CAC=0 or ISM=0 on channel N, then the radar reset value would be incremented again (e.g., radar reset=2). In an aspect, if the radar reset value is greater than 1 and a difference between the current time at which no radar signals were detected and the time at which the radar signals 428 were previously detected is greater than a threshold, then the core network 436 may indicate that channel N is free from radar. By checking for at least two negative radar confirmations for the same channel N and waiting for at least a threshold amount of time after an initial radar event to conclude that channel N is again a desirable channel to be used by UEs in the channel, the core network 436 helps prevent false negatives in radar detection.

In an aspect, the time threshold may be determined based on whether radar was previously reported based on a CAC or an ISM. If radar was reported based on ISM (e.g., ISM=1), the time threshold may be set to 2 hours, for example. But if radar was reported based on CAC (e.g., CAC=1), the time threshold may be set to 24 hours. The time threshold is shorter for ISM because a radar report during ISM is more likely to be a false positive. Therefore, a shorter wait time may be sufficient for making the channel available again after an ISM. By contrast, radar reported during a CAC is more likely to be a real radar event. As such, a longer reset period (e.g., 24 hours) may be used to ensure that transmission on the channel has no detrimental effect on potential radar signals.

In radar detection, false positives are not uncommon. As such, any algorithm to verify the presence of radar signals may benefit from considering the possibility of false positives as discussed above, especially when the radar detection is performed in dense environments (where there are co-channel and adjacent channel WLANs). A fixed radar in an area is likely to be detected by a CAC of all UEs in a cell area. A mobile radar is likely to be detected by one or more UEs after the CAC. If only one UE of multiple UEs in a cell report a CAC=1, the core network 436 may determine that the positive CAC is likely a false positive. Multiple UEs are less likely to report a false positive at the same time.

In another aspect, the fourth UE 442 may perform CAC and determine a level of wireless activity or noise on one or more 5 GHz channels. The fourth UE 442 may determine a channel desirability value for the one or more 5 GHz channels. The fourth UE 442 may transmit the results of the CAC and the CDV in a beacon message. The beacon message may be received by the first UE 402 and the second UE 410. In an aspect, the second UE 410 may perform CAC on 5 GHz channels but avoid any channels determined by the fourth UE 442 to contain radar signals. In this aspect, the second UE 410 may select a 5 GHz channel to use for LTE-U communication with the second base station 414. The selected 5 GHz channel may be based the received beacon message from the fourth UE 442. For example, the second UE 410 may select a channel with a low CDV as announced in the beacon message from the fourth UE 442. In this aspect, the second UE 410 need not be in communication with the core network 436 to receive channel information.

Although the aforementioned discussion utilizes the 5 GHz band as the unlicensed spectrum, other unlicensed frequency bands capable of supporting cellular and/or WLAN connections may also be used. Furthermore, although the discussion refers to LTE-U as an example, it is understood that the principles and techniques described herein may also be applicable to coordinate channel availability for WLAN and other wireless technology deployed over other unlicensed spectrums.

Figure 5:
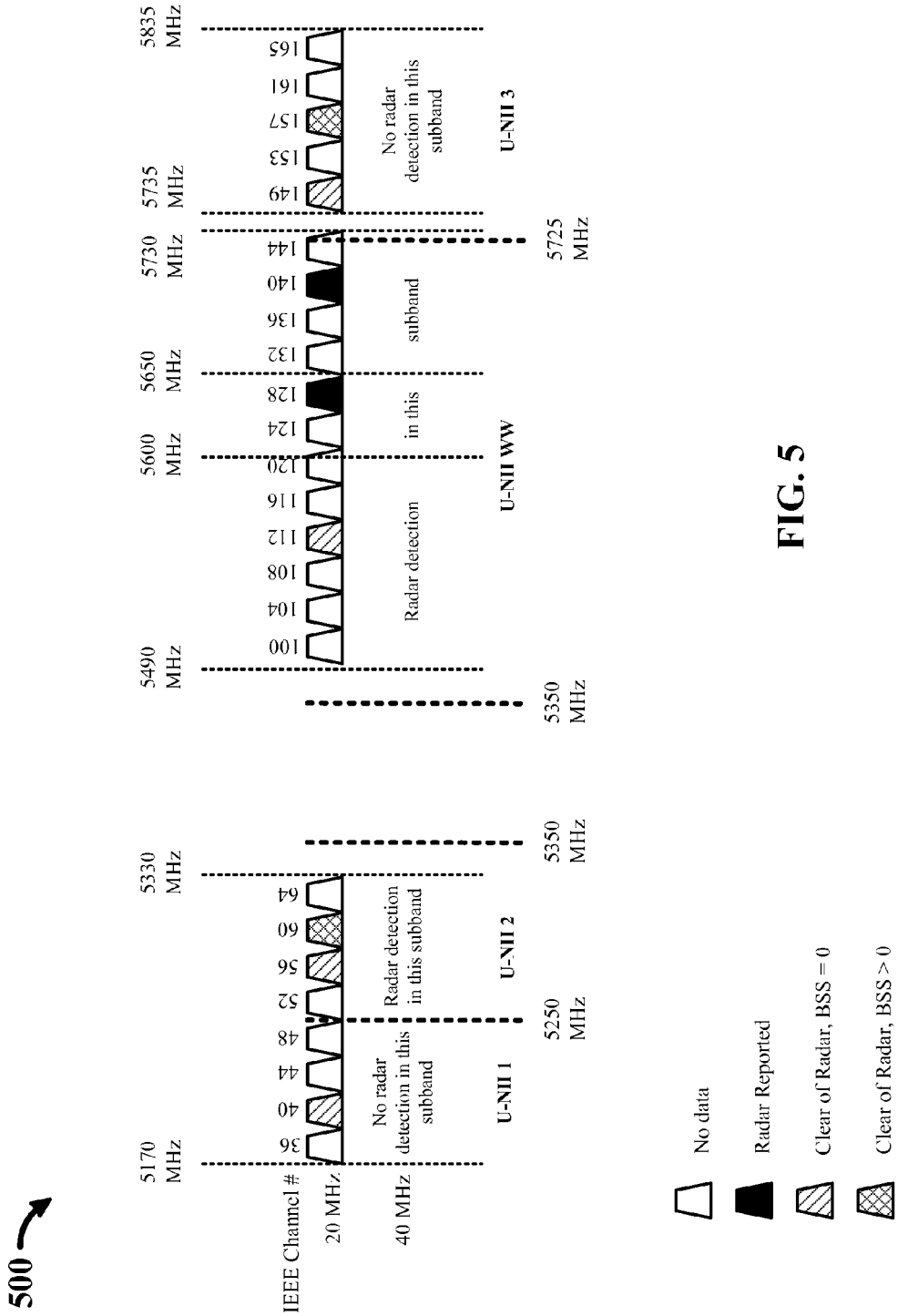
FIG. 5 illustrates an exemplary channel map for a single cell in a radio access network.

FIG. 5 illustrates an exemplary channel map 500 for a single cell in a radio access network. Referring to FIG. 5, a sample status snapshot of all the 5 GHz U-NII channels is shown. The sample status snapshot may be an alternative representation of the real-time table that is stored and compiled by the core network 436 in FIG. 4. As shown in FIG. 5, the 5 GHz U-NII channels operate over four ranges: U-NII 1, U-NII 2, U-NII World Wide, and U-NII 3. U-NII 1 may be limited to indoor use. U-NII 2 may be used in both outdoor and indoor environments, subject to DFS or radar avoidance. U-NII 2 may be used in both outdoor and indoor environments, subject to DFS or radar avoidance. U-NII 3 bands were originally allocated for industrial, scientific, and medical purposes but are increasingly used for telecommunications. Radar detection is required in U-NII 2 and U-NII WW but not in U-NII 1 or U-NII 3.

Referring to FIG. 5, assuming a channel bandwidth of 20 MHz, IEEE channel numbers 36, 40, 44, 48, 52, 56, 60, 64, 100, 104, 108, 112, 116, 120, 124, 128, 132, 136, 140, 144, 149, 153, 157, 161, and 165 are provided. Each channel is associated with a channel status: no data, radar reported, clear of radar and BSS=0, clear of radar and BSS>0. In an aspect, the BSS may be a channel desirability value that indicates a level of wireless activity on a channel. As shown in FIG. 5, channels 36, 44, 48, 52, 64, 100, 104, 108, 116, 120, 124, 132, 136, 144, 153, 161, and 165 may have no channel data because the core network 436 has not received any channel feedback reports associated with those channels. Channels 128 and 140 may have radar reported. For example, the first UE 402 and the fourth UE 442 may have performed CAC and detected radar signals on channels 128 and 140. The first and fourth UEs 402, 442 may have reported the channel information for channels 128 and 140 in a channel feedback report to the core network 436. The core network 436 may indicate that channels 128 and 140 have radar signals based on the received channel feedback reports. Channels that have radar typically do not have any non-radar wireless activity because wireless devices would be prohibited from transmitting on channels with radar signals due to DFS requirements. Furthermore, the first UE 402 may determine that channels 40, 56, 112, and 149 are clear of radar and have little to no wireless activity (e.g., channel desirability value or BSS=0). The first UE 402 may further determine that channels 60 and 157 are clear of radar but have wireless activity above a threshold (e.g., channel desirability value or BSS>0). As such, the first UE 402 may transmit the channel information for channels 40, 56, 60, 112, 157, and 149 in a channel feedback report to the core network 436. The core network 436 may update the channel information accordingly. In aspect, channels 124 and 128 may be allocated for weather radar usage, and thus, channels 124 and 128 may be avoided if possible.

As shown in FIG. 5, only 20 MHz IEEE channels are used throughout because radar signals are typically bounded within one or two such channels. UE/WLAN devices may derive which 40, 80, and 160 MHz channels to attempt operation based on the 20 MHz channel data provided by the core network 436. As such, the core network 436 need not consider higher bandwidth IEEE channels when compiling the real-time table and when providing channel recommendations. With respect to channel recommendations, if LTE-U is only allowed in U-NII 3 upper 5 GHz band, the core network 436 may recommend channels (e.g., channels clear of radar with BSS=0) for WLAN in the U-NII 1 bands (because no radar detection is required), then next recommend channels in U-NII 2. This steers UEs to use available channels free of radar but reserving operation in the channels desired for LTE-U use for potential use in near term when LTE-U operation is initiated by a UE in the cell. In an aspect, the channel map may be continuously updated and made available to all UEs in a cell. In an aspect, the core network 436 may provide the channel map as status information to various wireless devices.

Figure 6:
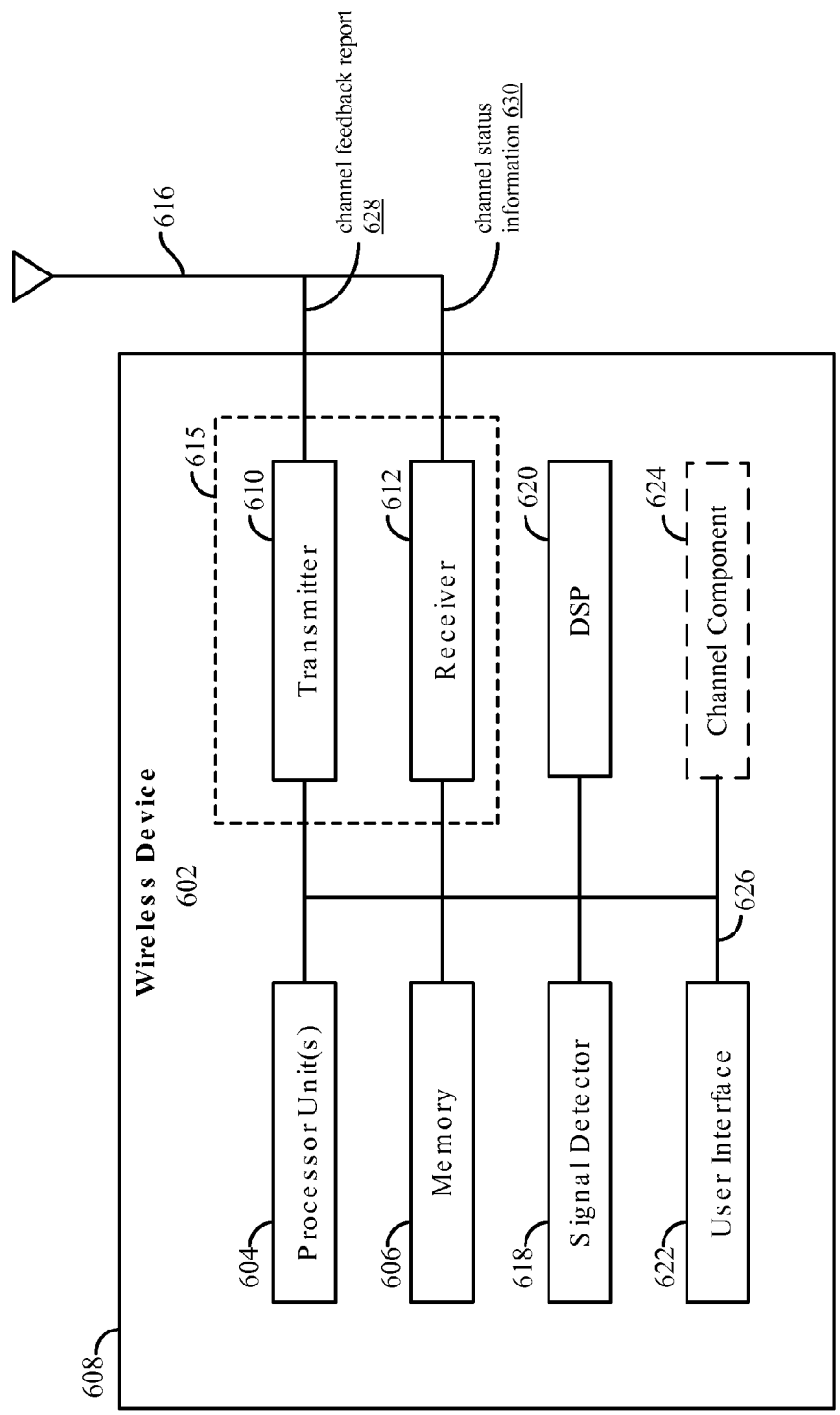
FIG. 6 shows an example functional block diagram of a wireless device that may provide channel feedback reports and receive channel status information within the wireless communication system of FIG. 1.

FIG. 6 shows an example functional block diagram of a wireless device 602 that may provide channel feedback reports and receive channel status information within the wireless communication system 100 of FIG. 1. The wireless device 602 is an example of a device that may be configured to implement the various methods described herein. For example, the wireless device 602 may comprise one of the one of the STAs 112, 114, 116, 118 or one of the UEs 402, 410, 418, 442.

The wireless device 602 may include a processor 604 which controls operation of the wireless device 602. The processor 604 may also be referred to as a central processing unit (CPU). Memory 606, which may include both read-only memory (ROM) and random access memory (RAM), may provide instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable (by the processor 604, for example) to implement the methods described herein.

The processor 604 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 602 may also include a housing 608, and the wireless device 602 may include a transmitter 610 and/or a receiver 612 to allow transmission and reception of data between the wireless device 602 and a remote device. The transmitter 610 and the receiver 612 may be combined into a transceiver 614. An antenna 616 may be attached to the housing 608 and electrically coupled to the transceiver 614. The wireless device 602 may also include multiple transmitters, multiple receivers, multiple transceivers, and/or multiple antennas.

The wireless device 602 may also include a signal detector 618 that may be used to detect and quantify the level of signals received by the transceiver 614 or the receiver 612. The signal detector 618 may detect such signals as total energy, energy per subcarrier per symbol, power spectral density, and other signals. The wireless device 602 may also include a digital signal processor (DSP) 620 for use in processing signals. The DSP 620 may be configured to generate a packet for transmission. In some aspects, the packet may comprise a physical layer convergence procedure (PLCP) protocol data unit (PPDU).

The wireless device 602 may further comprise a user interface 622 in some aspects. The user interface 622 may comprise a keypad, a microphone, a speaker, and/or a display. The user interface 622 may include any element or component that conveys information to a user of the wireless device 602 and/or receives input from the user.

When the wireless device 602 is implemented as a STA/UE (e.g., the STA 114 or the first UE 402), the wireless device 602 may also comprise a channel component 624. In one configuration, the channel component 624 may be configured to determine whether radar signals are present on one or more channels. The channel component 624 may be configured to transmit a channel feedback report (e.g., a channel feedback report 628) that includes channel information for each of the one or more channels based on the determination of whether radar signals are present on the one or more channels. In an aspect, the determination of whether radar signals are present may not be based on whether the wireless device 602 intends to communicate on a 5 GHz channel. In another aspect, the channel component 624 may be configured to determine whether radar signals are present by scanning the one or more channels for radar signals and storing a list comprising the channel information associated with each of the one or more channels. The list may indicate whether each of the one or more channels has radar signals. In this configuration, the transmitted channel feedback report may include the list. In another aspect, the channel component 624 may be configured to determine an amount of non-radar wireless activity on the one or more channels. In this aspect, the stored list may include a channel desirability value associated with the determined amount of non-radar wireless activity on each of the one or more channels. In another aspect, the channel information for each of the one or more channels may include at least one of a time at which radar signal detection was attempted, a frequency range of a detected radar signal, a set of radar signal characteristics, a received radar vector, a geographical location of the wireless device when radar signal detection was attempted, or an indication of wireless activity. In another aspect, the channel feedback report may indicate at least one of a time at which the channel feedback report was generated, a list of 5 GHz channels utilized by the wireless device, or a modulation type for each of the 5 GHz channels utilized by the wireless device. In another configuration, the channel component 624 may be configured to receive channel status information from a base station. The channel status information may indicate for each channel in a set of channels at least one of whether channel information is available, whether radar was detected, or a channel desirability value. In the configuration, the determination of whether radar signals are present on the one or more channels may be based on the received channel status information. In an aspect, the channel component 624 may be configured to receive additional channel feedback information detected by a second wireless device. The additional channel feedback information may include feedback information on whether radar signals were detected in a set of channels or whether wireless activity was detected on the set of channels. In this configuration, the transmitted channel feedback report may include the received additional channel feedback information.

In another aspect, the channel component 624 may be configured to receive channel status information (e.g., channel status information 630). The channel status information may include channel information for each 5 GHz channel within a set of 5 GHz channels. In this aspect, the channel component 624 may be configured to select a 5 GHz channel from the set of 5 GHz channels based on the received channel status information. In another aspect, the channel status information may include, for each 5 GHz channel in the set of 5 GHz channels, an indication of whether data is available, an indication of whether radar signals have been reported, or an indication of whether a channel desirability value is known. In another aspect, the channel component 624 may be configured to determine whether radar signals are present on the selected 5 GHz channel. In another aspect, the channel component 624 may be configured to select a different 5 GHz channel from the set of 5 GHz channels based on the received channel status information if the selected 5 GHz channel is determined to have radar signals. In another aspect, the channel component 624 may be configured to communicate on the selected 5 GHz channel when radar signals are absent from the selected 5 GHz channel. In another aspect, the channel component 624 may be configured to transmit a message to a base station indicating the selected 5 GHz channel on which the wireless device is communicating.

The various components of the wireless device 602 may be coupled together by a bus system 626. The bus system 626 may include a data bus, for example, as well as a power bus, a control signal bus, and a status signal bus in addition to the data bus. Components of the wireless device 602 may be coupled together or accept or provide inputs to each other using some other mechanism.

Although a number of separate components are illustrated in FIG. 6, one or more of the components may be combined or commonly implemented. For example, the processor 604 may be used to implement not only the functionality described above with respect to the processor 604, but also to implement the functionality described above with respect to the signal detector 618, the DSP 620, the user interface 622, and/or the channel component 624. Further, each of the components illustrated in FIG. 6 may be implemented using a plurality of separate elements.

Figure 7:
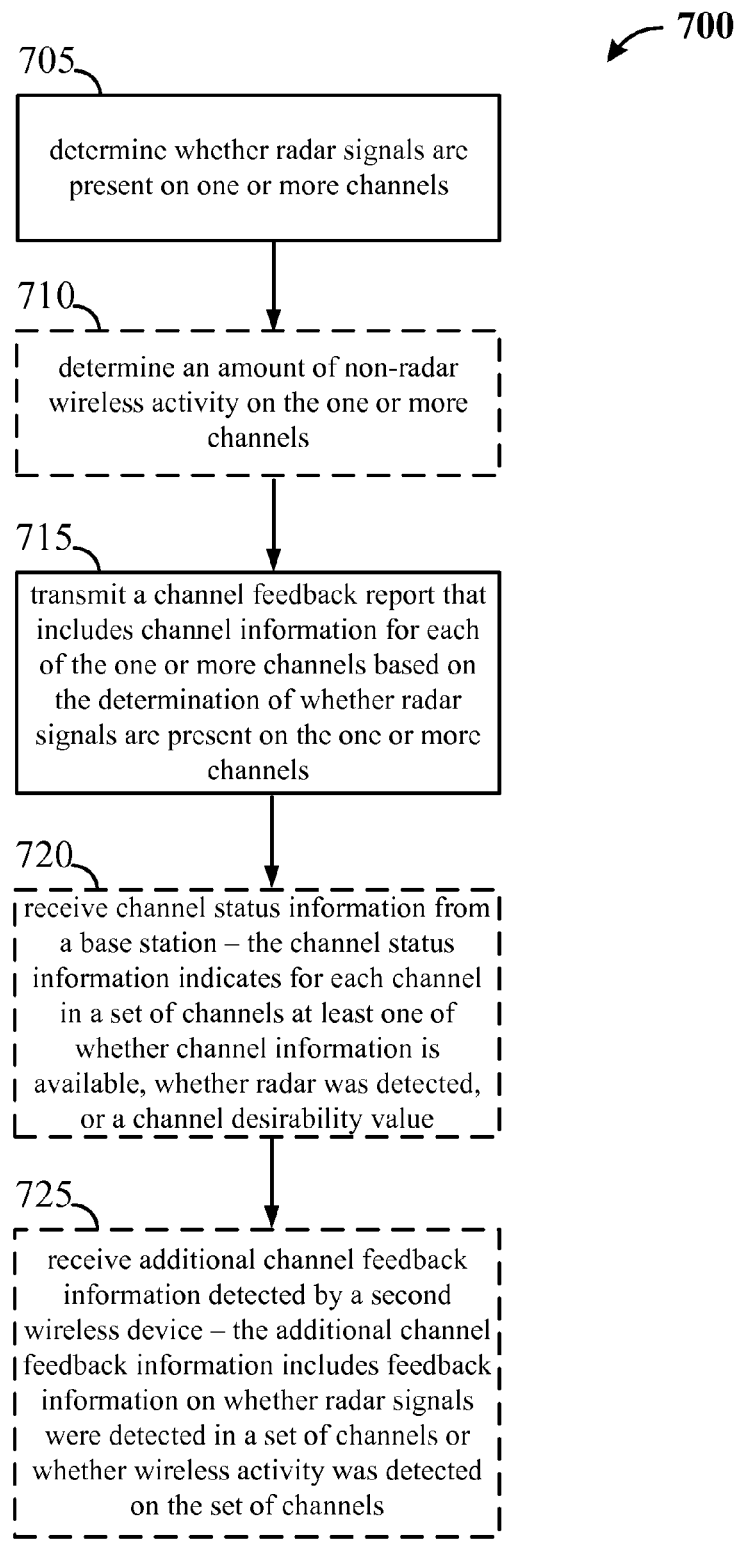
FIG. 7 is a flowchart of an example method for providing channel feedback for 5 GHz unlicensed band channel coordination.

FIG. 7 is a flowchart of an example method 700 for providing channel feedback for 5 GHz unlicensed band channel coordination. The method 700 may be performed using an apparatus (e.g., the STA 114, the first, second, third, and fourth UEs 402, 410, 418, 442, or the wireless device 602, for example). Although the method 700 is described below with respect to the elements of wireless device 602 of FIG. 6, other components may be used to implement one or more of the steps described herein.

At block 705, the apparatus may determine whether radar signals are present on one or more channels. In an aspect, determining whether radar signals are present may include scanning the one or more channels for radar signals and storing a list that includes the channel information associated with each of the one or more channels. The list may indicate whether each of the one or more channels has radar signals. In an aspect, the channel information stored in the list may include a time at which radar signal detection was attempted, a frequency range of a detected radar signal, a set of radar signal characteristics, a received radar vector, a geographical location of the wireless device when radar signal detection was attempted, or an indication of wireless activity. For example, referring to FIGS. 4 and 5, the first UE 402 may determine whether radar signals are present on channels 56, 60, 112, and 140. In this example, the first UE 402 intends to communicate on a 5 GHz channel. The first UE 402 may perform CAC on channels 56, 60, 112, and 140 to scan for radar signals. The first UE 402 may detect the radar signals 428 on channel 140. The first UE 402 may compare the characteristics of the radar signals 428 detected on channel 140 with known radar characteristics (e.g., number of pulses received within a period of time and bandwidth characteristics of the radar signals 428). Based on the comparison (e.g., correlation above a threshold), the first UE 402 may determine that the radar signals 428 detected on channel 140 are indeed radar signals. The first UE 402 may perform CAC on channels 56, 60, and 112 and determine that channels 56, 60, and 112 do not contain radar signals. The first UE 402 may store a list that includes channel information associated with channels 56, 60, 112, and 140. The list may indicate which of the channels 56, 60, 112, and 140 have radar signals. For example, the CAC value associated with channel 56 may be 0 and the CAC value associated with channel 140 may be 1. The list may also include a time at which CAC was performed on each of the channels 56, 60, 112, and 140. For channel 140, the list may include a frequency range and a set of characteristics for the radar signals 428. For each of the channels 56, 60, 112, and 140, the list may include a cell ID associated with the first cell 408.

At block 710, the apparatus may determine an amount of non-radar wireless activity on the one or more channels. The stored list may include a channel desirability value associated with the determined amount of non-radar wireless activity on each of the one or more channels. For example, referring to FIGS. 4 and 5, the first UE 402 may determine an amount of non-radar wireless activity on channels 56, 60, 112, and 140. Channel 140 may not have any non-radar wireless activity because the radar signals 428 are being transmitted on channel 140. For channels 56, 60, and 112, however, the first UE 402 may measure the channels to determine an energy detection level and/or determine a number of preambles received, if any. The first UE 402 may compare the measured energy detection level to an energy threshold or compare the received number of preambles to a preamble threshold. Because neither the energy detection level nor a received number of preambles exceeds a respective threshold, the first UE 402 may determine that channels 56 and 112 have no wireless activity (e.g., no other BSSs are transmitting on the channels). As such, the first UE 402 may set CDV to 0 for channels 56 and 112. The CDV may be considered an indication of wireless activity. By contrast, for channel 60, the first UE 402 may determine that an energy detection level exceeds a threshold, and therefore, the first UE 402 may conclude that another BSS is transmitting on channel 60. The first UE 402 may determine a channel desirability value according to an energy detection level and/or received number of preambles. In this example, the first UE 402 may choose a CDV of 2 with respect to channel 60. The first UE 402 may store, in the list, the determined CDV values along with a respective timestamp at which the CDV was determined.

At block 715, the apparatus may transmit a channel feedback report that includes channel information for each of the one or more channels based on the determination of whether radar signals are present on the one or more channels. In an aspect, the channel feedback report may include the stored list. In another aspect, the channel feedback report may indicate at least one of a time at which the channel feedback report was generated, a list of 5 GHz channels utilized by the wireless device, or a modulation type for each of the 5 GHz channels utilized by the wireless device. For example, referring to FIG. 4, the first UE 402 may transmit the third channel feedback report that includes channel information for channels 56, 60, 112, and 140 based on the determination of whether radar signals were present on channels 56, 60, 112, and 140. The third channel feedback report may indicate that channels 56, 60, and 112 do not have radar signals but channel 140 has radar signals. The third channel feedback report may include timestamps for each CAC performed on each channel. The third channel feedback report may also include CDV of 0 for channels 56 and 112 and a CDV of 2 for channel 60. The third channel feedback report may include a timestamp at which the third channel feedback report was generated and include a list of 5 GHz channels utilized by the first UE 402 along with a modulation type.

At block 720, the apparatus may receive channel status information from a base station. The channel status information may indicate for each channel in a set of channels at least one of whether channel information is available, whether radar was detected, or a channel desirability value. For example, referring to FIGS. 4 and 5, the first UE 402 may receive channel status information from the first base station 406. The channel status information may indicate channel information of channels 128, 144, 149, 153, 157, 161, and 165. The channel status information may indicate for channel 128 that radar signals were detected at a particular time. As such, the first UE 402 would not perform CAC on this channel. The channel status information may indicate for channels 144, 153, 161, and 165 that no data is available. The channel status information may indicate that channel 149 is clear of radar and has a CDV value set to 0 and that channel 157 is also clear of radar and has a CDV value of 3. Based on this received channel status information, the first UE 402 may perform CAC on channel 149 to be used for setting up a hotspot connection with the local device 430.

At block 725, the apparatus may receive additional channel feedback information detected by a second wireless device. The additional channel feedback information may include feedback information on whether radar signals were detected in a set of channels or whether wireless activity was detected on the set of channels. For example, referring to FIGS. 4 and 5, the first UE 402 may receive additional feedback information detected by the second UE 410. The additional channel feedback information may be received in a beacon message (e.g., a WLAN beacon). The additional channel feedback information may indicate that channel 140 has radar signals and channels 56, 60, and 112 do not have radar signals. The additional channel feedback information may indicate that channels 56 and 112 have a CDV of 0 and channel 112 has a CDV of 2. In this example, the first UE 402 may transmit any channel information detected by the first UE 402 along with the received additional channel feedback information in a beacon message that may be received by other wireless devices.

Figure 8:
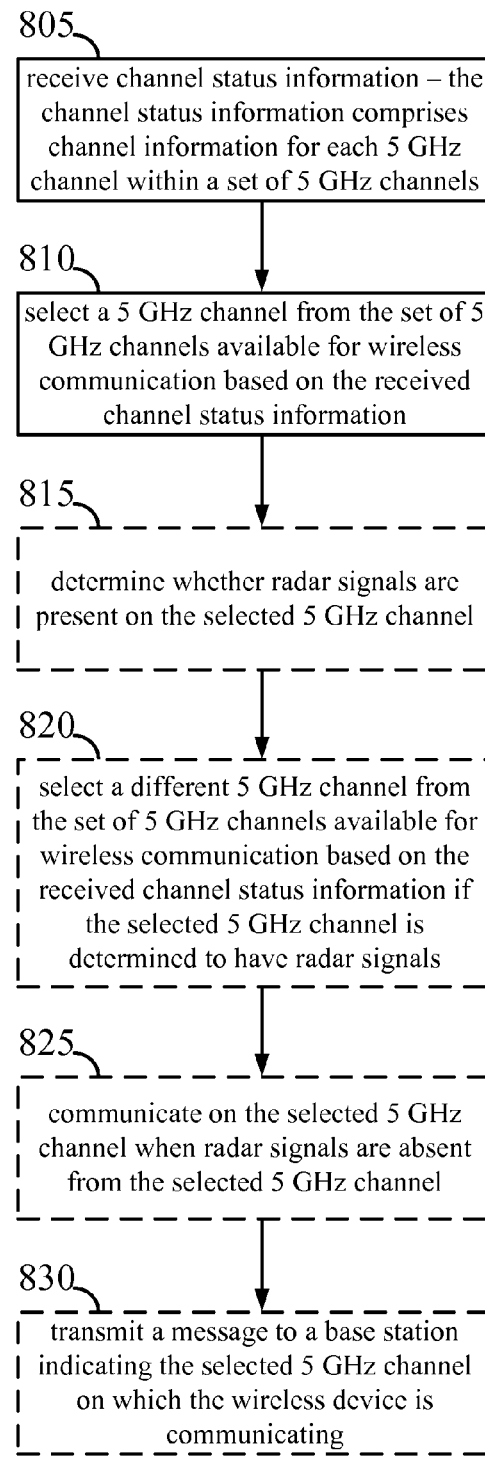
FIG. 8 is a flowchart of an example method for selecting an unlicensed band channel for communication based on availability coordination.

FIG. 8 is a flowchart of an example method 800 for selecting an unlicensed band channel for communication based on availability coordination. The method 800 may be performed using an apparatus (e.g., the STA 114, the first, second, third, and fourth UEs 402, 410, 418, 442, or the wireless device 602, for example). Although the method 800 is described below with respect to the elements of wireless device 602 of FIG. 6, other components may be used to implement one or more of the steps described herein.

At block 805, the apparatus may receive channel status information. The channel status information may include channel information or each 5 GHz channel within a set of 5 GHz channels. In an aspect, the channel status information may include, for each 5 GHz channel, at least one of an indication of whether data is available for a channel, an indication of whether radar signals have been reported on the channel, or an indication of whether a channel desirability value is known. For example, referring to FIGS. 4 and 5, the second UE 410 may receive channel status information from the core network 436 via the first base station 406 or the second base station 414. The channel status information may be for the set of channels 36, 40, 44, 48, 52, 56, 60, 64, 100, 104, 108, 112, 116, 120, 124, 128, 132, 136, 140, 144, 149, 153, 157, 161, and 165. The channel status information may indicate that no data is available on channels 36, 44, 48, 52, 64, 100, 104, 108, 116, 120, 124, 132, 136, 144, 153, 161, and 165 because the core network 436 has not received any channel feedback reports associated with those channels. The channel status information may indicate that channels 128 and 140 have radar reported. The channel status information may indicate that channels 40, 56, 112, and 149 are clear of radar and has little to no wireless activity (e.g., channel desirability value or BSS=0). The channel status information may indicate that channels 60 and 157 are also clear of radar but have CDV>0. If a CDV is not known for a channel, the channel status information may include a null value for the CDV. Otherwise, if CDV is known, the CDV may be a numeric value from 0-9. In another example, the channel status information may be received from the fourth UE 442 in a beacon message.

At block 810, the apparatus may select a 5 GHz channel from the set of 5 GHz channels based on the received channel status information. For example, referring to FIG. 4, the second UE 410 may select channel 112 from the set of 5 GHz channels based on the received channel status information.

At block 815, the apparatus may determine whether radar signals are present on the selected 5 GHz channel. For example, referring to FIG. 4, the second UE 410 may perform CAC on channel 112 to determine whether radar signals are present on the selected 5 GHz channel.

At block 820, the apparatus may select a different 5 GHz channel from the set of 5 GHz channels based on the received channel status information if the selected 5 GHz channel is determined to have radar signals. For example, referring to FIGS. 4 and 5, the second UE 410 may select channel 56 if channel 112 is determined to have radar signals after performing a CAC.

At block 825, the apparatus may communicate on the selected 5 GHz channel when radar signals are absent from the selected 5 GHz channel. For example, referring to FIG. 4, the second UE 410 may communicate on the selected channel 112 when radar signals are absent from channel 112. The second UE 410 may set up an LTE-U or WLAN 5 GHz communication link with the second base station 414. The second UE 410 may periodically perform ISM while operating on channel 112 to determine whether radar signals are detected.

At block 830, the apparatus may transmit a message to a base station indicating the selected 5 GHz channel on which the wireless device is communicating. For example, referring to FIG. 4, the second UE 410 may transmit a message to the second base station 414 indicating that channel 112 is selected for communication. In an aspect, the message may be a channel feedback report, and the channel feedback report may include a modulation type used on channel 112.

Figure 9:
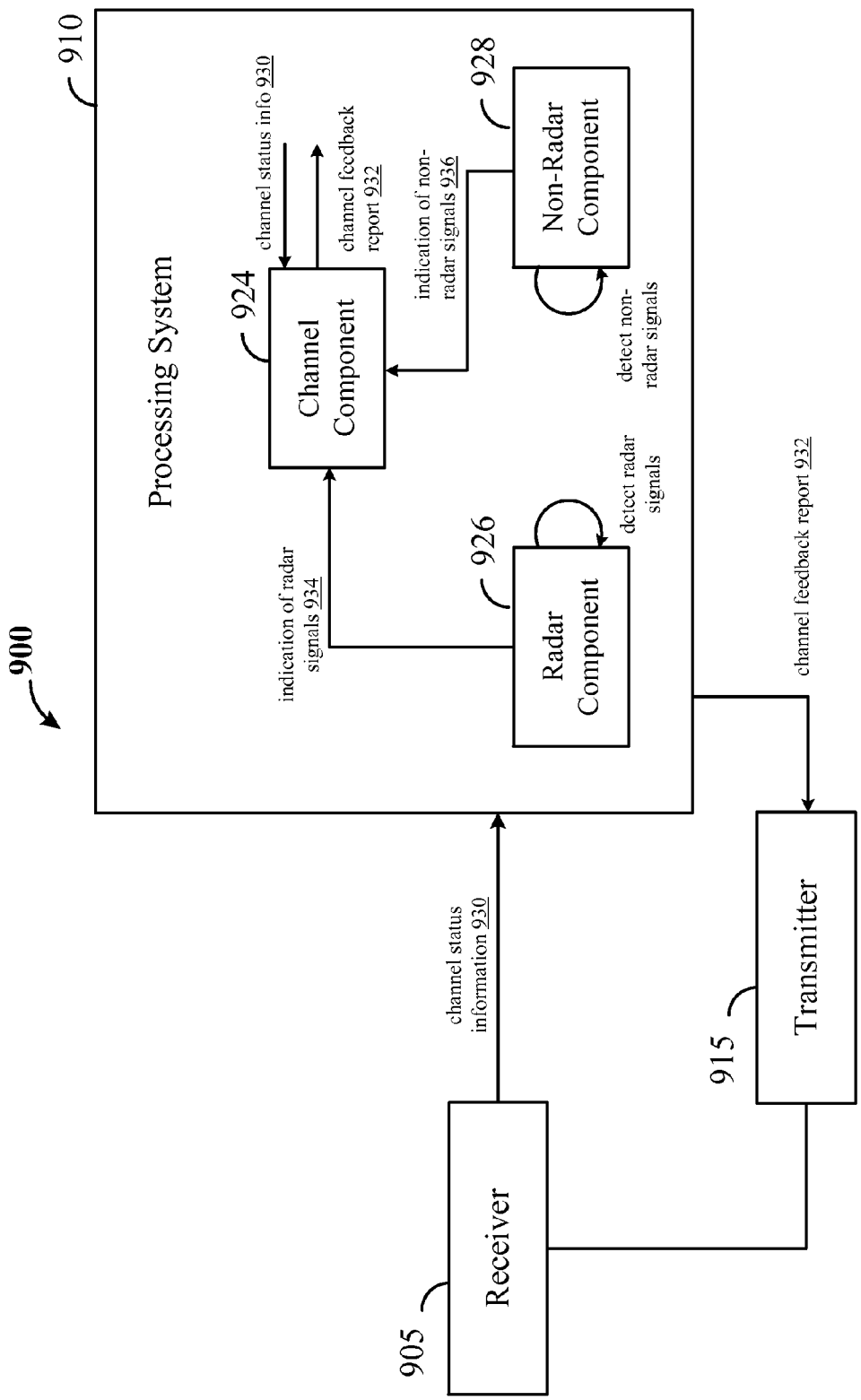
FIG. 9 is a functional block diagram of an example wireless communication device that may provide channel feedback reports and receive channel status information for unlicensed channels.

FIG. 9 is a functional block diagram of an example wireless communication device 900 that may provide channel feedback reports and receive channel status information for unlicensed channels. The wireless communication device 900 may include a receiver 905, a processing system 910, and a transmitter 915. The processing system 910 may include a channel component 924, a radar component 926, and/or a non-radar component 928. In one configuration, the processing system 910, the channel component 924, and/or the radar component 926 may be configured to determine whether radar signals are present on one or more channels. For example, the radar component 926 may detect when any radar signals are present and send an indication of radar signals 934 to the channel component 924. The processing system 910, the channel component 924, and/or the transmitter 915 may be configured to transmit a channel feedback report (e.g., a channel feedback report 932) that includes channel information for each of the one or more channels based on the determination of whether radar signals are present on the one or more channels. In an aspect, the determination of whether radar signals are present is not based on whether the wireless communication device 900 intends to communicate on a 5 GHz channel. In another aspect, the processing system 910, the channel component 924, the radar component 926, and/or the receiver 905 may be configured to determine whether radar signals are present by scanning the one or more channels for radar signals and storing a list comprising the channel information associated with each of the one or more channels. The list may indicate whether each of the one or more channels has radar signals. The transmitted channel feedback report may include the list. In an aspect, the processing system 910, the channel component 924, the non-radar component 928, and/or the receiver 905 may be configured to determine an amount of non-radar wireless activity on the one or more channels. The stored list may include a channel desirability value associated with the determined amount of non-radar wireless activity on each of the one or more channels. The channel information for each of the one or more channels may include at least one of a time at which radar signal detection was attempted, a frequency range of a detected radar signal, a set of radar signal characteristics, a received radar vector, a geographical location of the wireless device when radar signal detection was attempted, or an indication of wireless activity (e.g., a CDV 0-9 or a null value). For example, the non-radar component 928 may be configured to detect whether wireless activity is present on one or more channels and transmit an indication of non-radar signals 936 to the channel component 924. In another aspect, the channel feedback report may indicates at least one of a time at which the channel feedback report was generated, a list of 5 GHz channels utilized by the wireless communication device 900, or a modulation type for each of the 5 GHz channels utilized by the wireless device. In another aspect, the processing system 910, the channel component 924, and/or the receiver 905 may be configured to receive channel status information from a base station. The channel status information may indicate for each channel in a set of channels at least one of whether channel information is available, whether radar was detected, or a channel desirability value. In this aspect, the determination of whether radar signals are present on the one or more channels may be based on the received channel status information. In another aspect, the processing system 910, the channel component 924, and/or the receiver 905 may be configured to receive additional channel feedback information detected by a second wireless device. The additional channel feedback information may include feedback information on whether radar signals were detected in a set of channels or whether wireless activity was detected on the set of channels. In this aspect, the transmitted channel feedback report may include the received additional channel feedback information.

In another configuration, the processing system 910, the channel component 924, and/or the receiver 905 may be configured to receive channel status information (e.g., channel status information 930). The channel status information may include channel information for each 5 GHz channel within a set of 5 GHz channels. The processing system 910 and/or the channel component 924 may be configured to select a 5 GHz channel from the set of 5 GHz channels based on the received channel status information. In an aspect, the channel status information may include, for each 5 GHz channel, at least one of an indication of whether data is available, an indication of whether radar signals have been reported, or an indication of whether a channel desirability value is known. In an aspect, the processing system 910 and/or the channel component 924 may be configured to determine whether radar signals are present on the selected 5 GHz channel. In another aspect, the processing system 910 and/or the channel component 924 may be configured to select a different 5 GHz channel from the set of 5 GHz channels based on the received channel status information if the selected 5 GHz channel is determined to have radar signals. In another aspect, the processing system 910, the channel component 924, the receiver 905, and/or the transmitter 915 may be configured to communicate on the selected 5 GHz channel when radar signals are absent from the selected 5 GHz channel. In another aspect, the processing system 910, the channel component 924, and/or the transmitter 915 may be configured to transmit a message to a base station indicating the selected 5 GHz channel on which the wireless communication device 900 is communicating.

The receiver 905, the processing system 910, the channel component 924, and/or the transmitter 915 may be configured to perform one or more functions discussed above with respect to blocks 705, 710, 715, 720, and 725 of FIG. 7 and to blocks 805, 810, 815, 820, 825, and 830 of FIG. 8. The receiver 905 may correspond to the receiver 612. The processing system 910 may correspond to the processor 604. The transmitter 915 may correspond to the transmitter 610. The channel component 924 may correspond to the channel component 126, and/or the channel component 624.

In one configuration, the wireless communication device 900 may include means for determining whether radar signals are present on one or more channels. The wireless communication device 900 may include means for transmitting a channel feedback report that includes channel information for each of the one or more channels based on the determination of whether radar signals are present on the one or more channels. In one configuration, the means for determining whether radar signals are present may not be based on whether the wireless device intends to communicate on a 5 GHz channel. In another configuration, the means for determining whether radar signals are present may be configured to scan the one or more channels for radar signals and to store a list comprising the channel information associated with each of the one or more channels. The list may indicate whether each of the one or more channels has radar signals, and the transmitted channel feedback report may include the list. The wireless communication device 900 may include determining an amount of non-radar wireless activity on the one or more channels, and the stored list may include a channel desirability value associated with the determined amount of non-radar wireless activity on each of the one or more channels. In an aspect, the channel information for each of the one or more channels may include at least one of a time at which radar signal detection was attempted, a frequency range of a detected radar signal, a set of radar signal characteristics, a received radar vector, a geographical location of the wireless device when radar signal detection was attempted, or an indication of wireless activity. In another aspect, the channel feedback report may indicate at least one of a time at which the channel feedback report was generated, a list of 5 GHz channels utilized by the wireless device, or a modulation type for each of the 5 GHz channels utilized by the wireless device. In another configuration, the wireless communication device 900 may include means for receiving channel status information from a base station. The channel status information may indicate, for each channel in a set of channels, at least one of whether channel information is available, whether radar was detected, or a channel desirability value. In this configuration, the determination of whether radar signals are present on the one or more channels is based on the received channel status information. In another configuration, the wireless communication device 900 may include means for receiving additional channel feedback information detected by a second wireless device. The additional channel feedback information may include feedback information on whether radar signals were detected in a set of channels or whether wireless activity was detected on the set of channels. In an aspect, the transmitted channel feedback report may include the received additional channel feedback information.

In another configuration, the wireless communication device 900 may include means for receiving channel status information. The channel status information may include channel information for each 5 GHz channel within a set of 5 GHz channels. The wireless communication device 900 may include means for selecting a 5 GHz channel from the set of 5 GHz channels based on the received channel status information. In an aspect, the channel status information may include, for each 5 GHz channel, at least one of an indication of whether data is available, an indication of whether radar signals have been reported, or an indication of whether a channel desirability value is known. In another configuration, the wireless communication device 900 may include means for determining whether radar signals are present on the selected 5 GHz channel. In another configuration, the wireless communication device 900 may include means for selecting a different 5 GHz channel from the set of 5 GHz channels based on the received channel status information if the selected 5 GHz channel is determined to have radar signals. In another configuration, the wireless communication device 900 may include means for communicating on the selected 5 GHz channel when radar signals are absent from the selected 5 GHz channel. In another configuration, the wireless communication device 900 may include means for transmitting a message to a base station indicating the selected 5 GHz channel on which the wireless device is communicating.

For example, means for determining whether radar signals are present on one or more channels may include the processing system 910, the channel component 924, and/or the receiver 905. Means for transmitting the channel feedback report may include the processing system 910, the channel component 924, and/or the transmitter 915. Means for determining the amount of non-radar wireless activity may include the processing system 910, the channel component 924, and/or the receiver 905. Means for receiving channel status information may include the processing system 910, the channel component 924, and/or the receiver 905. Means for receiving additional channel feedback information may include the processing system 910, the channel component 924, and/or the receiver 905. Means for selecting a 5 GHz channel may include the processing system 910 and/or the channel component 924. Means for determining whether radar signals are present on the selected 5 GHz channel may include the processing system 910, the channel component 924, and/or the receiver 905. Means for selecting a different 5 GHz channel may include the processing system 910 and/or the channel component 924. Means for communicating on the selected 5 GHz channel may include the processing system 910, the channel component 924, the transmitter 915, and/or the receiver 905. Means for transmitting a message to a base station may include the processing system 910, the channel component 924, and/or the transmitter 915.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Figure 10:
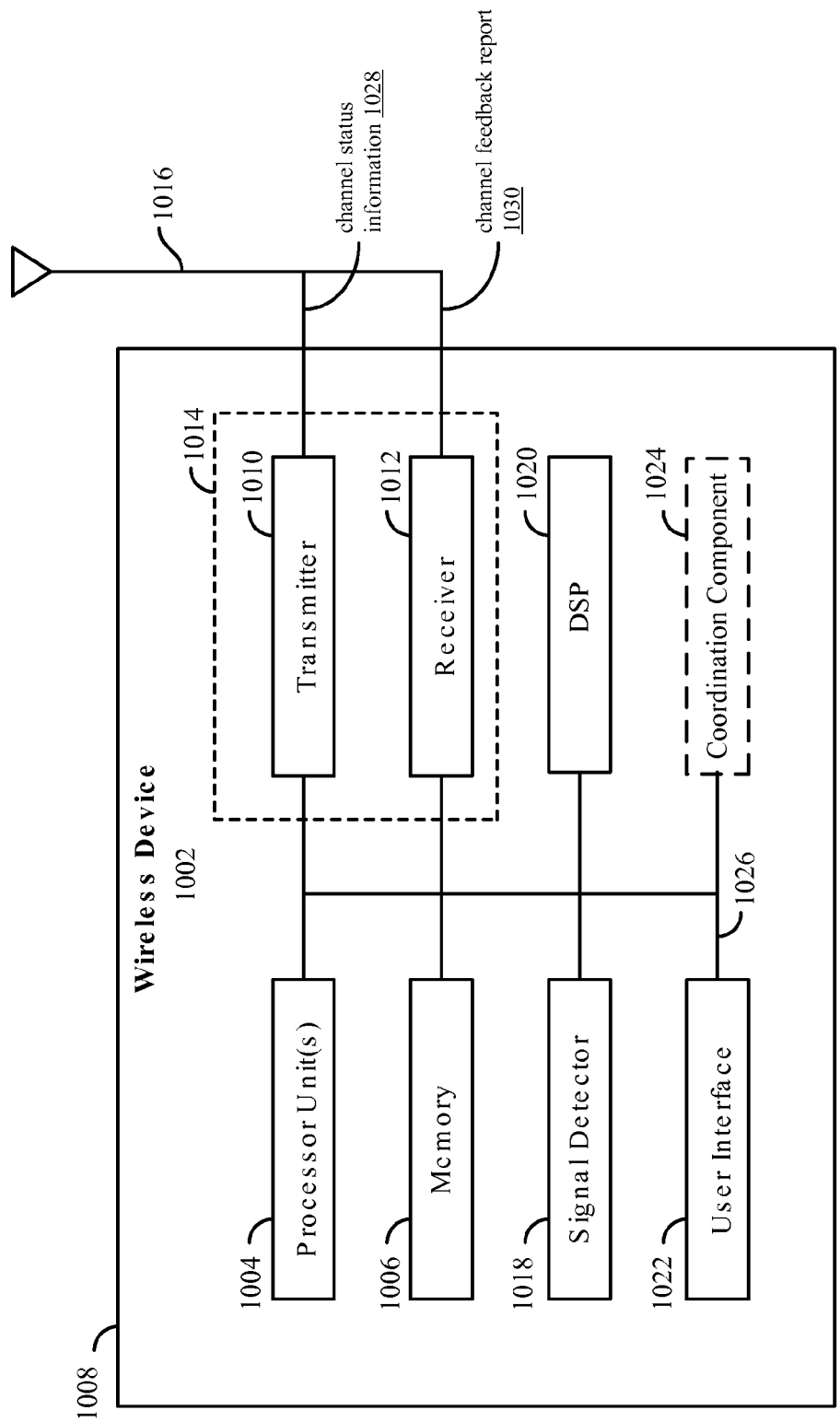
FIG. 10 shows an example functional block diagram of a wireless device that may perform channel availability coordination within the wireless communication system of FIG. 1.

FIG. 10 shows an example functional block diagram of a wireless device 1002 that may perform channel availability coordination within the wireless communication system 100 of FIG. 1. The wireless device 1002 is an example of a device that may be configured to implement the various methods described herein. For example, the wireless device 1002 may a core network 120 or a device/entity within the core network 120.

The wireless device 1002 may include a processor 1004 which controls operation of the wireless device 1002. The processor 1004 may also be referred to as a CPU. Memory 1006, which may include both ROM and RAM, may provide instructions and data to the processor 1004. A portion of the memory 1006 may also include NVRAM. The processor 1004 typically performs logical and arithmetic operations based on program instructions stored within the memory 1006. The instructions in the memory 1006 may be executable (by the processor 1004, for example) to implement the methods described herein.

The processor 1004 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1002 may also include a housing 1008, and the wireless device 1002 may include a transmitter 1010 and/or a receiver 1012 to allow transmission and reception of data between the wireless device 1002 and a remote device. The transmitter 1010 and the receiver 1012 may be combined into a transceiver 1014. An antenna 1016 may be attached to the housing 1008 and electrically coupled to the transceiver 1014. The wireless device 1002 may also include multiple transmitters, multiple receivers, multiple transceivers, and/or multiple antennas.

The wireless device 1002 may also include a signal detector 1018 that may be used to detect and quantify the level of signals received by the transceiver 1014 or the receiver 1012. The signal detector 1018 may detect such signals as total energy, energy per subcarrier per symbol, power spectral density, and other signals. The wireless device 1002 may also include a DSP 1020 for use in processing signals. The DSP 1020 may be configured to generate a packet for transmission. In some aspects, the packet may comprise a PPDU.

The wireless device 1002 may further comprise a user interface 1022 in some aspects. The user interface 1022 may comprise a keypad, a microphone, a speaker, and/or a display. The user interface 1022 may include any element or component that conveys information to a user of the wireless device 1002 and/or receives input from the user.

When the wireless device 1002 is implemented as a core network, the wireless device 1002 may also comprise a coordination component 1024. The coordination component 1024 may be configured to receive a channel feedback report (e.g., a channel feedback report 1030) from at least one wireless device. The channel feedback report may indicate whether radar signals were detected on one or more channels. The coordination component 1024 may be configured to transmit channel status information (e.g., channel status information 1028) based on the received channel feedback information to a wireless device. The coordination component 1024 may be configured to determine channel status information based on the received channel feedback report from the at least one wireless device. In an aspect, the channel status information may include channel information for each of the one or more channels, and in which the channel information may include an indication of whether non-radar wireless activity was detected, an indication of whether a radar signal was detected, a channel desirability value, or an indication of an unknown channel desirability value. The coordination component 1024 may be configured to receive updated channel feedback information from the at least one wireless device. The updated channel feedback information may indicate whether radar signals were detected on the one or more channels. The coordination component 1024 may be configured to update the channel status information based on the updated channel feedback information. The channel status information may include an allocated set of 5 GHz channel assignments or a recommended set of available 5 GHz channels. The allocated set of 5 GHz channel assignments or the recommended set of available 5 GHz channels may be based on a geographical location of the wireless device or a communication type to be used by the wireless device.

The various components of the wireless device 1002 may be coupled together by a bus system 1026. The bus system 1026 may include a data bus, for example, as well as a power bus, a control signal bus, and a status signal bus in addition to the data bus. Components of the wireless device 1002 may be coupled together or accept or provide inputs to each other using some other mechanism.

Although a number of separate components are illustrated in FIG. 10, one or more of the components may be combined or commonly implemented. For example, the processor 1004 may be used to implement not only the functionality described above with respect to the processor 1004, but also to implement the functionality described above with respect to the signal detector 1018, the DSP 1020, the user interface 1022, and/or the coordination component 1024. Further, each of the components illustrated in FIG. 10 may be implemented using a plurality of separate elements.

Figure 11:
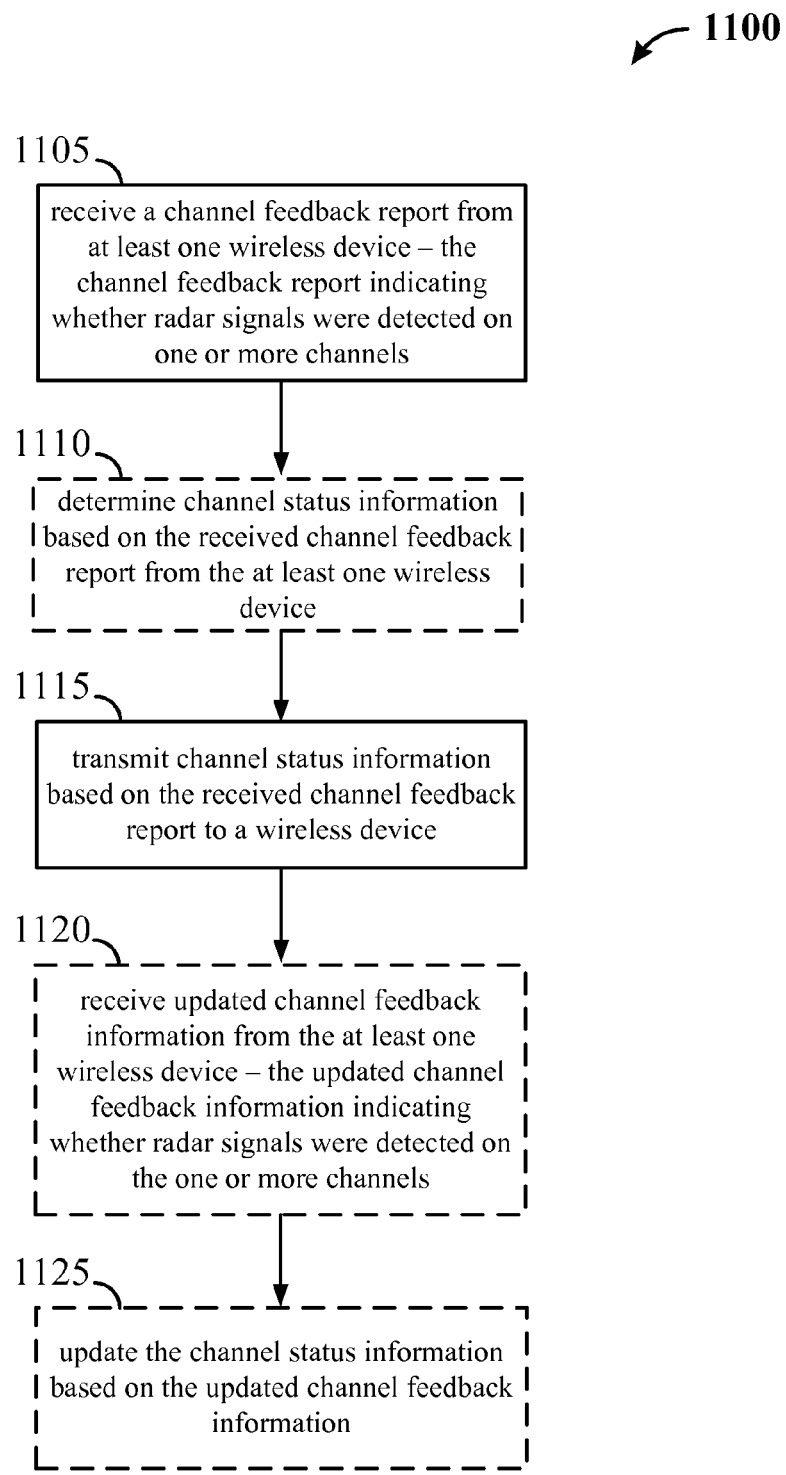
FIG. 11 is a flowchart of an example method for performing channel availability coordination.

FIG. 11 is a flowchart of an example method 1100 for performing channel availability coordination. The method 1100 may be performed using an apparatus (e.g., the core network 120, the core network 436, or the wireless device 1002, for example). Although the method 1100 is described below with respect to the elements of wireless device 1002 of FIG. 10, other components may be used to implement one or more of the steps described herein.

At block 1105, the apparatus may receive a channel feedback report from at least one wireless device. The channel feedback report may indicate whether radar signals were detected on one or more channels. For example, referring to FIG. 4, the core network 436 may receive the first and second channel feedback reports from the third UE 418 and the third channel feedback report from the first UE 402. The third channel feedback report may indicate that radar was detected on channel 140.

At block 1110, the apparatus may determine channel status information based on the received channel feedback report from the at least one wireless device. For example, referring to FIG. 4, the core network 436 may have a real-time table for channels 36, 44, 48, 52, 64, 100, 104, 108, 116, 120, 124, 132, 136, 144, 153, 161, and 165 associated with the third cell 424. Based on the first and second channel feedback reports from the third UE 418, the core network 436 may determine that channel 52 has radar, channel 64 is clear from radar and has a CDV of 0, and channel 100 is clear from radar and has a CDV of 9. With respect to the third channel feedback report, the core network 436 may associate the channel information with a different real-time table because the core network 436 may determine that the third channel feedback report is associated with the first cell 408. Based on the third channel feedback report, the core network 436 may determine that there is radar on channel 140, that channels 40, 56, 112, and 149 are clear from radar and have CDV set to 0, and that channels 60 and 157 are clear from radar but have non-zero CDVs.

At block 1115, the apparatus may transmit the channel status information based on the received channel feedback information to a wireless device. The channel status information may include channel information for each of the one or more channels. The channel information may include an indication of whether non-radar wireless activity was detected, an indication of whether a radar signal was detected, a channel desirability value, or an indication of an unknown channel desirability value. For example, referring to FIG. 4, the core network 436 may transmit channel status information based on the third channel feedback report to the second UE 410. In an aspect, the channel status information may also be transmitted to the first UE 402 and the fourth UE 442. The channel status information associated with the first cell 408, however, may not be transmitted to the third UE 418 because the third UE 418 is located in a different cell. In an aspect, the channel information for channel 140 may indicate that the channel has radar. The channel information for channel 56 may indicate that the channel is clear of radar and has a CDV of 0. The channel information for channel 52 may indicate that no channel information is available. The channel information or channel 60 may indicate that the channel 60 is clear of radar but the CDV is set to 2. In an aspect, an indication of an unknown channel desirability value may be a null value for CDV rather than a numeric value between 0-9.

In one configuration, the channel status information may include an allocated set of 5 GHZ channel assignments or a recommended set of available 5 GHz channels. The allocated set of 5 GHz channel assignments or the recommended set of available 5 GHz channels may be based on a geographical location of the wireless device or a communication type to be used by the wireless device. For example, the core network 436 may transmit channel status information to the first UE 402, the second UE 410, and the fourth UE 442. In this aspect, LTE-U may only use U-NII 2. As such, the channel status information sent to the second UE 410 includes a recommendation to use channel 56. The channel status information sent to the first UE 402 may exclude channels from U-NII 2 to reserve U-NII 2 for LTE-U communication. The channel status information sent to first UE 402 may be from U-NII WW, for example, and the channel status information may recommend channel 112 and/or any other channel in U-NII WW. The fourth UE 442 may have high priority information. As such, the recommended channels for the fourth UE 442 may be in U-NII 1 (e.g., channel 40) to allow the fourth UE 442 to avoid having to perform radar detection.

At block 1120, the apparatus may receive updated channel feedback information from the at least one wireless device. The updated channel feedback information may indicate whether radar signals were detected on the one or more channels. For example, referring to FIG. 4, the core network

436 may receive a fourth channel feedback report from the first UE 402. The fourth feedback report may indicate that no radar signals were detected on channel 140.

At block 1125, the apparatus may update the channel status information based on the updated channel feedback information. For example, referring to FIG. 4, upon receiving the fourth channel feedback report from the first UE 402, the core network may update the channel status information associated with channel 140 to indicate that channel 140 no longer has radar signals.

Figure 12:
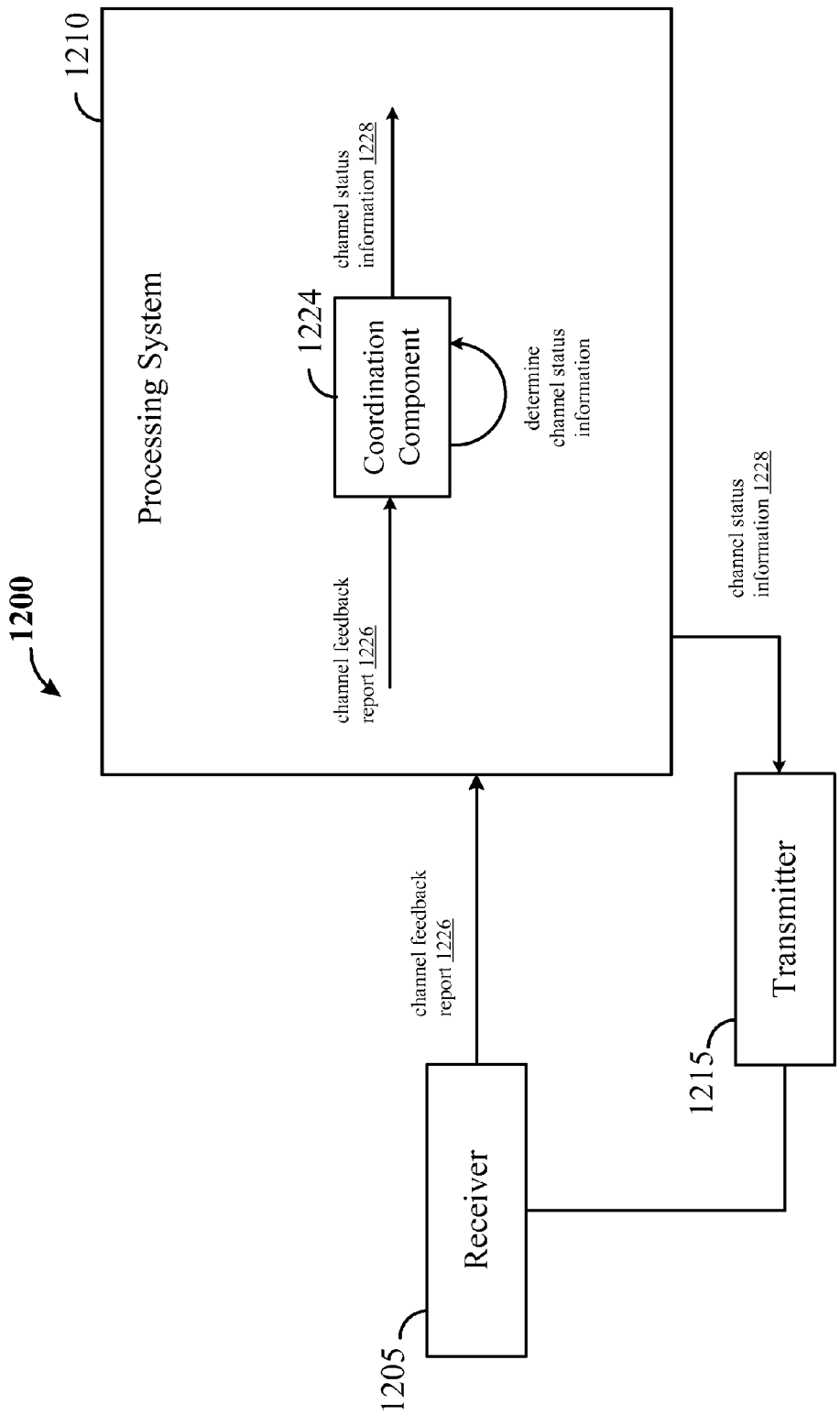
FIG. 12 is a functional block diagram of an example wireless communication device that performs channel availability coordination.

FIG. 12 is a functional block diagram of an example wireless communication device 1200 that performs channel availability coordination. The wireless communication device 1200 may include a receiver 1205, a processing system 1210, and a transmitter 1215. The processing system 1210 may include a coordination component 1224.

In one configuration, the receiver 1205, the processing system 1210, and/or the coordination component 1224 may be configured to receive a channel feedback report (e.g., a channel feedback report 1226) from at least one wireless device. The channel feedback report may indicate whether radar signals were detected on one or more channels. The processing system 1210, the coordination component 1224, and/or the transmitter 1215 may be configured to transmit channel status information (e.g., channel status information 1228) based on the received channel feedback report to a wireless device. The processing system 1210 and/or the coordination component 1224 may be configured to determine channel status information based on the received channel feedback report from the at least one wireless device. In an aspect, the channel status information may include channel information for each of the one or more channels. The channel information may include an indication of whether non-radar wireless activity was detected, an indication of whether a radar signal was detected, a channel desirability value, or an indication of an unknown channel desirability value. In another aspect, the processing system 1210, the coordination component 1224, and/or the receiver 1205 may be configured to receive updated channel feedback information from the at least one wireless device. The updated channel feedback information may indicate whether radar signals were detected on the one or more channels. The processing system 1210 and/or the coordination component 1224 may be configured to update the channel status information based on the updated channel feedback information. In an aspect, the channel status information may include an allocated set of 5 GHz channel assignments or a recommended set of available 5 GHz channels. In another aspect, the allocated set of 5 GHz channel assignments or the recommended set of available 5 GHz channels may be based on a geographical location of the wireless device or a communication type to be used by the wireless device.

The receiver 1205, the processing system 1210, the coordination component 1224, and/or the transmitter 1215 may be configured to perform one or more functions discussed above with respect to FIGS. 1-5, 10, and 11. The receiver 1205 may correspond to the receiver 1012. The processing system 1210 may correspond to the processor 1004. The transmitter 1215 may correspond to the transmitter 1010. The coordination component 1224 may correspond to the coordination component 124, and/or the coordination component 1024.

In one configuration, the wireless communication device 1200 may include means for receiving a channel feedback report from at least one wireless device. The channel feedback report may indicate whether radar signals were detected on one or more channels. The wireless communication device 1200 may include means for transmitting channel status information based on the received channel feedback report to a wireless device. In another configuration, the wireless communication device 1200 may include means for determining channel status information based on the received channel feedback report from the at least one wireless device. In an aspect, the channel status information may include channel information for each of the one or more channels. The channel information may include an indication of whether non-radar wireless activity was detected, an indication of whether a radar signal was detected, a channel desirability value, or an indication of an unknown channel desirability value. In another configuration, the wireless communication device 1200 may include means for receiving updated channel feedback information from the at least one wireless device. The updated channel feedback information may indicate whether radar signals were detected on the one or more channels. In this configuration, the wireless communication device 1200 may include means for updating the channel status information based on the updated channel feedback information. In another aspect, the channel status information may include an allocated set of 5 GHz channel assignments or a recommended set of available 5 GHz channels. In another aspect, the allocated set of 5 GHz channel assignments or the recommended set of available 5 GHz channels may be based on a geographical location of the wireless device or a communication type to be used by the wireless device.

For example, means for receiving a channel feedback report may include the receiver 1205, the processing system 1210, and/or the coordination component 1224. The means for transmitting the channel status information may include the transmitter 1215, the processing system 1210, and/or the coordination component 1224. The means for determining channel status information may include the processing system 1210 and/or the coordination component 1224. The means for receiving updated channel feedback information may include the receiver 1205, the processing system 1210, and/or the coordination component 1224. The means for updating the channel status information may include the processing system 1210 and/or the coordination component 1224.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Thus, computer readable medium comprises non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a first wireless device, comprising:
    receiving channel status information from a base station, wherein the channel status information indicates, for each channel in a first set of channels, a channel desirability value;
    determining whether radar signals are present on one or more channels based on the received channel status information;
    receiving channel feedback information detected by a second wireless device, the channel feedback information comprising feedback information on whether radar signals were detected in a second set of channels; and
    transmitting a channel feedback report that comprises channel information for each of the one or more channels based on the determination of whether radar signals are present on the one or more channels and the received channel feedback information.

2. The method of claim 1, wherein determining whether radar signals are present on the one or more channels is not based on whether the first wireless device intends to communicate on a 5 gigahertz (GHz) channel.

3. The method of claim 1, wherein determining whether radar signals are present on the one or more channels comprises:
    scanning the one or more channels for radar signals; and
    storing a list comprising the channel information associated with each of the one or more channels, wherein the list indicates whether each of the one or more channels has radar signals, and the transmitted channel feedback report includes the list.

4. The method of claim 3, further comprising determining an amount of non-radar wireless activity on the one or more channels, wherein the stored list further comprises a channel desirability value associated with the determined amount of non-radar wireless activity on each of the one or more channels.

5. The method of claim 1, wherein the channel information for each of the one or more channels includes at least one of a time at which radar signal detection was attempted, a frequency range of a detected radar signal, a set of radar signal characteristics, a received radar vector, a geographical location of the first wireless device when radar signal detection was attempted, or an indication of wireless activity.

6. The method of claim 1, wherein the channel feedback report indicates at least one of a time at which the channel feedback report was generated, a list of 5 gigahertz (GHz) channels utilized by the first wireless device, or a modulation type for each of the 5 GHz channels utilized by the first wireless device.

7. The method of claim 1, wherein the channel feedback information further comprises feedback information on whether wireless activity was detected on the second set of channels.

8. The method of claim 1, wherein the channel status information further indicates, for each channel in the first set of channels, at least one of whether channel information is available or whether radar was detected.

9. An apparatus for wireless communication, comprising:
a memory; and
at least one processor coupled to the memory, wherein the at least one processor is configured to:
receive channel status information from a base station, wherein the channel status information indicates, for each channel in a first set of channels, a channel desirability value;
determine whether radar signals are present on one or more channels based on the received channel status information;
receive channel feedback information detected by a wireless device, the channel feedback information comprising feedback information on whether radar signals were detected in a second set of channels; and
transmit a channel feedback report that comprises channel information for each of the one or more channels based on the determination of whether radar signals are present on the one or more channels and the received channel feedback information.

10. The apparatus of claim 9, wherein the determination of whether radar signals are present on the one or more channels is not based on whether the apparatus intends to communicate on a 5 gigahertz (GHz) channel.

11. The apparatus of claim 9, wherein to determine whether radar signals are present on the one or more channels, the at least one processor is configured to:
scan the one or more channels for radar signals; and
store a list comprising the channel information associated with each of the one or more channels, wherein the list indicates whether each of the one or more channels has radar signals, and the transmitted channel feedback report includes the list.

12. The apparatus of claim 11, wherein the at least one processor is further configured to determine an amount of non-radar wireless activity on the one or more channels, wherein the stored list further comprises a channel desirability value associated with the determined amount of non-radar wireless activity on each of the one or more channels.

13. The apparatus of claim 9, wherein the channel information for each of the one or more channels includes at least one of a time at which radar signal detection was attempted, a frequency range of a detected radar signal, a set of radar signal characteristics, a received radar vector, a geographical location of the apparatus when radar signal detection was attempted, or an indication of wireless activity.

14. The apparatus of claim 9, wherein the channel feedback report indicates at least one of a time at which the channel feedback report was generated, a list of 5 gigahertz (GHz) channels utilized by the apparatus, or a modulation type for each of the 5 GHz channels utilized by the apparatus.

15. The apparatus of claim 9, wherein the channel feedback information further comprises feedback information on whether wireless activity was detected on the second set of channels.

16. The apparatus of claim 9, wherein the channel status information further indicates, for each channel in the first set of channels, at least one of whether channel information is available or whether radar was detected.

17. A method of wireless communication, comprising:
receiving a channel feedback report from at least one wireless device, the channel feedback report indicating whether radar signals were detected on one or more channels; and
transmitting channel status information based on the received channel feedback report to a wireless device, wherein the channel status information includes channel information for each of the one or more channels, and wherein the channel information comprises:
a channel desirability value or an indication of an unknown channel desirability value.

18. The method of claim 17, further comprising determining channel status information based on the received channel feedback report from the at least one wireless device.

19. The method of claim 17, further comprising:
receiving updated channel feedback information from the at least one wireless device, the updated channel feedback information indicating whether radar signals were detected on the one or more channels; and
updating the channel status information based on the updated channel feedback information.

20. The method of claim 17, wherein the channel status information comprises an allocated set of 5 gigahertz (GHz) channel assignments or a recommended set of available 5 GHz channels.

21. The method of claim 20, wherein the allocated set of 5 GHz channel assignments or the recommended set of available 5 GHz channels is based on a geographical location of the wireless device or a communication type to be used by the wireless device.

22. The method of claim 17, wherein the channel information comprises:
an indication of whether non-radar wireless activity was detected, or
an indication of whether a radar signal was detected.

23. An apparatus for wireless communication, comprising:
a memory; and
at least one processor coupled to the memory, wherein the at least one processor is configured to:
receive a channel feedback report from at least one wireless device, the channel feedback report indicating whether radar signals were detected on one or more channels; and
transmit channel status information based on the received channel feedback report to a wireless device, wherein the channel status information includes channel information for each of the one or more channels, and wherein the channel information comprises:
a channel desirability value or an indication of an unknown channel desirability value.

24. The apparatus of claim 23, wherein the at least one processor is further configured to determine channel status information based on the received channel feedback report from the at least one wireless device.

25. The apparatus of claim 23, wherein the at least one processor is further configured to:
   receive updated channel feedback information from the at least one wireless device, the updated channel feedback information indicating whether radar signals were detected on the one or more channels; and
   update the channel status information based on the updated channel feedback information.

26. The apparatus of claim 23, wherein the channel status information comprises an allocated set of 5 gigahertz (GHz) channel assignments or a recommended set of available 5 GHz channels.

27. The apparatus of claim 26, wherein the allocated set of 5 GHz channel assignments or the recommended set of available 5 GHz channels is based on a geographical location of the wireless device or a communication type to be used by the wireless device.

28. The apparatus of claim 23, wherein the channel information comprises:
   an indication of whether non-radar wireless activity was detected, or
   an indication of whether a radar signal was detected.

* * * * *